(12) United States Patent
Ito et al.

(10) Patent No.: US 6,260,654 B1
(45) Date of Patent: Jul. 17, 2001

(54) FRICTIONAL TRANSMISSION

(75) Inventors: Hiroyuki Ito; Hisashi Machida; Ryoichi Otaki, all of Fujisawa; Toshihiro Fukuda, Takasaki; Hiroshi Eda, Maebashi; Kazuo Chikaraishi, Takasaki, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/244,109

(22) Filed: Feb. 4, 1999

(30) Foreign Application Priority Data

| Feb. 6, 1998 | (JP) | 10-25684 |
| Feb. 6, 1998 | (JP) | 10-25685 |
| Aug. 20, 1998 | (JP) | 10-233912 |

(51) Int. Cl.⁷ .................................................. B62D 5/04
(52) U.S. Cl. ............................ 180/444; 180/443; 476/61
(58) Field of Search ................................ 180/443, 444; 476/61, 55, 56

(56) References Cited

U.S. PATENT DOCUMENTS

| 3,875,814 | * | 4/1975 | Steuer ................................ 74/194 |
| 4,109,541 | * | 8/1978 | Jesse ................................. 74/194 |
| 4,856,373 | * | 8/1989 | Washizawa ........................ 74/710.5 |
| 4,934,205 | * | 6/1990 | Takamiya et al. .................. 74/199 |
| 5,014,565 | * | 5/1991 | Stephenson ....................... 74/190 |
| 5,027,915 | * | 7/1991 | Suzuki et al. ..................... 180/79.1 |
| 5,209,315 | * | 5/1993 | Schlagmueller et al. .......... 180/79.1 |
| 5,445,237 | * | 8/1995 | Eda et al. ......................... 180/79.1 |
| 5,819,871 | * | 10/1998 | Takaoka ............................ 180/444 |
| 5,836,419 | * | 11/1998 | Shimizu et al. ................... 180/443 |
| 6,026,925 | * | 2/2000 | Nagao et al. ...................... 180/444 |

FOREIGN PATENT DOCUMENTS

| 58-193148 | 12/1983 | (JP) . |
| 6-288453 | 10/1994 | (JP) . |
| 7-71550 | 3/1995 | (JP) . |
| 7-139598 | 5/1995 | (JP) . |
| 7-158709 | 6/1995 | (JP) . |
| 8-28641 | 2/1996 | (JP) . |
| 8-114256 | 5/1996 | (JP) . |

OTHER PUBLICATIONS

Morita, Hitoshi, "Mechanism", section 3–4–2, pp. 44–45 (1974).

(List continued on next page.)

*Primary Examiner*—Brian L. Johnson
*Assistant Examiner*—Daniel Yeagley
(74) *Attorney, Agent, or Firm*—Vorys, Sater, Seymour and Pease LLP

(57) ABSTRACT

A frictional transmission comprises first and second rotary shafts arranged in directions in which the central axes thereof crossed each other, a roller supported coaxially with the first rotary shaft for rotating with the first rotary shaft, a first frictional surface provided on the roller coaxially with the first rotary shaft, a disc supported coaxially with the second rotary shaft for rotating with the second rotary shaft, and a second frictional surface provided on this disc coaxially with the second rotary shaft. The second frictional surface and the first frictional surface are brought into frictional engagement with each other. A loading cam device is arranged so as to press the second frictional surface toward the first frictional surface at the time of driving. A further disc coaxial with the aforementioned disc is disposed in the environs of the second rotary shaft, and the roller is sandwiched by and between the two discs. This further disc is rotatably supported by an angular-type ball bearing relative to the second rotary shaft and the first-mentioned disc in the environs of the second rotary shaft in a state that this further disc is prevented from being displaced in a direction to be separated from the first-mentioned disc.

96 Claims, 17 Drawing Sheets

OTHER PUBLICATIONS

M. Yamanaka et al., "Efficiency of Crossed Axle Type Traction Drive", Japan Mechanics Society 7th National Assembly Papers, pp. 195–196, Oct. 1–4, 1998.

K. Shibata et al., "Development of Crossed Axle Type Traction Drive", Japan Mechanics Society Tohoku Branch 33rd General Assembly Papers, pp. 147–148, Mar. 14, 1998.

M. Kato et al., "Development of Crossed Axle Type Traction Drive", Pre–Print Papers of Japan Mechanics Society Tohoku Student Society 28th Graduation Research Papers pp. 73–74, Mar. 7, 1998.

* cited by examiner

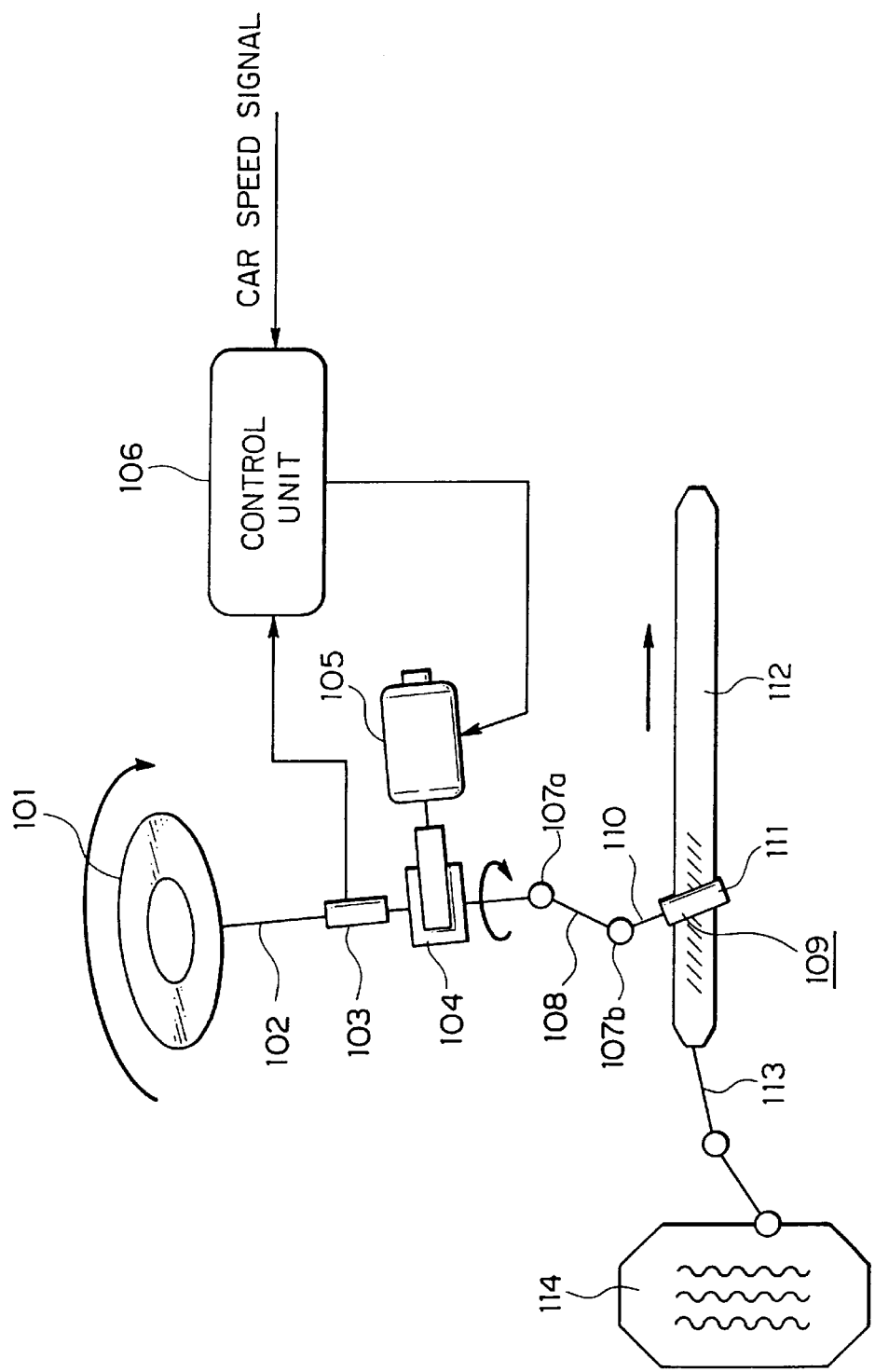

FRICTIONAL TRANSMISSION

This application claims the benefits of Japanese Application Nos. 10-025684, 10-025685 and 10-233912 filed Feb. 6, 1998 and Aug. 20, 1998 respectively.

BACKGROUND OF THE INVENTION

1. Field of the Invention

The present invention relates to a frictional transmission which is assembled in a power transmitting unit of mechanical apparatus of various kinds for decelerating a rotational motion and increasing a torque from, for example, an electric motor, or increasing a rotating speed to transmit the same to an output unit.

The present invention also relates to an electric power steering apparatus which is assembled in a steering apparatus of an automobile for reducing a power required for the driver to operate a steering wheel by utilizing the electric motor as an auxiliary power source.

2. Related Background Art

A transmission for varying and transmitting a rotating speed is employed in mechanical apparatus of many kinds. As such a transmission, there is conventionally used a frictional speed decreasing apparatus, in addition to a geared transmission including a worm transmission, planetary reduction gear, etc.

Out of these devices, in the geared transmission which is used generally, it is required to have a double-line arrangement of gears or to use a large-sized gear, for obtaining a large ratio of speed change (a ratio of speed decrease or a ratio of speed increase). For this reason, it is difficult to realize a geared transmission of a small size and capable of obtaining a large ratio of speed change. Also, since it is required to set a backlash in the geared transmission, a shake is inevitably generated to some extent in a transmission part thereof, which may bring about a problem of the transmission in some use.

Also, in the case of a worm transmission, it is possible to obtain a large ratio of speed decrease in a comparative small size. However, it is impossible to obtain a large ratio of speed increase if the worm transmission is of small size. Moreover, in the case of the worm transmission, not only a shake is inevitably brought about, like in the case of an ordinary geared transmission, but also a high efficiency can be hardly obtained.

On the other hand, in the case of a frictional transmission, there is no need to set a backlash, unlike in the case of the geared transmission, so that no shake is brought about. As such a frictional transmission, there is conventionally known that disclosed in Japanese Patent Application Laid-Open No. 6-288453. The frictional transmission disclosed in this Laid-Open gazette is arranged by bringing the outer peripheral surface of a small-diameter taper roller having a tapered form and concentric with an input shaft and the outer peripheral surface of a large-diameter taper roller having a tapered form concentric with an output shaft into frictional engagement.

However, in the case of the frictional transmission disclosed in this Laid-Open gazette, a contact pressure between the outer peripheral surfaces of the two taper rollers cannot be stabilized from the first stage of the power transmission. Consequently, the efficiency of power transmission is deteriorated at this first stage.

As an apparatus for reducing the power which is required for the driver to operate a steering wheel when a steering angle is given to a steered wheel (which is normally a front wheel except in a special vehicle such as a forklift), a power steering apparatus is widely used. Also, as one type of such power steering apparatuses, an electric power steering apparatus employing an electric motor as its auxiliary power source has become widely in use. Such an electric power steering apparatus can be made in a small size with a light weight, compared with a hydraulic power steering apparatus, since the magnitude of the auxiliary power (torque) can be easily controlled with less loss of the engine power in this electric power steering apparatus.

In the case of such conventional electric power steering apparatus as described above, since a geared transmission, such as a worm transmission, is used as a speed reducing device to be disposed between an electric motor and a steering shaft, a noise, vibration, and the like are generated when the auxiliary power is given, which gives the occupants including the driver an undiscomfort ablesentation in some cases. Also, since there exists a backlash which is avoidable in the geared transmission, a response may be somewhat deteriorated to bring about poor operability in some cases. Especially, since the backlash generated in a speed reducing device portion may become a play (shake) in a direction of rotation of the steering shaft in an enlarged condition in some cases, the above-mentioned response is easily deteriorated conspicuously. These problems can be removed to some extent by reducing the backlash, or forming a gear for constituting the speed reducing device of synthetic resin. However, other problems are generated such as the control of the dimensional accuracy becoming more difficult. Since the gear made of synthetic resin has a smaller allowable surface pressure and a smaller allowable stress than those of a metallic gear made of, for example, steel, it is difficult to combine such gear with an electric motor having a large output. Moreover, since the heat-resisting performance of the gear of synthetic resin is inferior to that of a metallic gear, it is difficult to install such gear of synthetic resin in an engine compartment which rises to a high temperature (especially an engine compartment of a high performance car with a high-output engine mounted thereon). For these reasons, under present conditions, the electric power steering apparatus is used limitedly in a comparatively inexpensive small-sized car, partly also because of an output of the electric motor thereof, and a conventional hydraulic steering apparatus is used in a large-sized or expensive car.

If a frictional transmission is used as such transmission, it is possible to prevent a play which causes the above-mentioned problems. However, there still remain problems to be solved for realizing a small-sized electric power steering apparatus with a satisfactory efficiency. For example, in order to secure the energy efficiency, it is preferable to use an electric motor with a small torque, in exchange for a high rotating speed. On the other hand, when the electric motor with a small torque in exchange for a high rotating speed is used, it is required to increase a speed reducing ratio of transmission. However, in practice, according to the prior art, a small-sized frictional transmission with a speed reducing ratio and excellent transmitting efficiency has not yet been attained and a small-sized electric power steering apparatus with a high energy efficiency and an excellent response has not yet been realized. If plural frictional transmissions are arranged in series with respect to the direction of power transmission, a large speed reducing ratio can be attained. However, the structure of such arrangement is complicated to increase the cost, so that it becomes difficult to reduce the size and the weight of the electric power steering apparatus.

SUMMARY OF THE INVENTION

Considering these circumstances, an object of the present invention is to provide a frictional transmission capable of obtaining a large gear ratio in a small size and also capable of obtaining an excellent transmitting efficiency from the first stage of power transmission.

A frictional transmission of the present invention comprises first and second rotary shafts arranged in directions in which the central axes thereof are crossing each other, a roller supported coaxially with the first rotary shaft for rotating with this first rotary shaft, a first frictional surface provided on this roller coaxially with the first rotary shaft, a first disc supported concentrically with the second rotary shaft for rotating with this second rotary shaft, and a second frictional surface provided on this first disc concentrically with the second rotary shaft. The second frictional surface and the first frictional surface are brought into frictional engagement with each other. A loading cam device is arranged so as to press one frictional surface toward the other frictional surface at the time of driving. Also, a second disc which is coaxial with the first disc is disposed in the environs of the second rotary shaft, and the roller is sandwiched by and between these first and second discs. This second disc is rotatably supported by an angular-type ball bearing relatively to the second rotary shaft and the first disc in the environs of the second rotary shaft in a state that this second disc is prevented from being displaced in a direction to be separated from the first disc. Further, a preload spring is provided for elastically pressing the first frictional surface and the second frictional surface to each other.

A gear ratio obtained by the frictional transmission of the present invention as described above corresponds to a ratio between the diameter of the first frictional surface and the diameter of the second frictional surface. In the case of the frictional transmission of the present invention, since both of the first and second rotary shafts are arranged in the directions in which the central axes of these two rotary shafts are crossing each other, the diameter of the first frictional surface and that of the second frictional surface can be set freely. Specifically, since the diameter of either of the frictional surfaces can be set to be considerably small, it is possible to realize a frictional transmission which is of a small size and is capable of obtaining a large gear ratio by setting a ratio between the diameter of the first frictional surface and that of the second frictional surface large. Further, since the roller is sandwiched by and between the discs and this frictional transmission is provided with the loading cam device and the pressurization spring, the power transmission between the roller and the first disc can be carried out stably from the first stage through a normal driving condition for transmitting a large power.

Another object of the present invention is to provide an electric power steering apparatus which is capable of realizing a large gear ratio by means of a single frictional transmission to provide an excellent energy efficiency, and which can be manufactured in a small size with a reduced weight.

An electric power steering apparatus of the present invention comprises a main rotary shaft to which a power in a direction of rotation is given on the basis of an operation of a steering wheel and which gives a steering angle corresponding to an amount of rotation to the steering wheel, an auxiliary rotary shaft which is disposed in a direction crossing the direction of arrangement of this main rotary shaft and is driven to rotate by means of an electric motor, a driving roller which is supported by and fixed to the auxiliary rotary shaft coaxially with this auxiliary rotary shaft and rotates together with this auxiliary rotary shaft, a driving frictional surface which is disposed on this driving roller coaxially with the auxiliary rotary shaft, a driven disc which is supported by and fixed to the main rotary shaft concentrically with this main rotary shaft and rotates together with this main rotary shaft, and a driven frictional surface which is disposed on this driven disc concentrically with the main rotary shaft. The driven frictional surface and the driving frictional surface are brought into frictional engagement with each other. Also, a loading cam device is arranged so as to press one frictional surface toward the other frictional surface at the time of driving. Further, there is provided an idler disc which is coaxial with the driven disc, and the driving roller is sandwiched by and between these driven and idler discs.

Upon operation of the electric power steering apparatus of the present invention having the above structure, a rotational driving power applied to the auxiliary rotary shaft from the electric motor is transmitted to the main rotary shaft through the transmission comprised of the driving roller and the driven disc, so as to give an auxiliary power to this main rotary shaft. Then, this main rotary shaft is driven to rotate by a force which is larger than that applied to the steering wheel, so as to give the steering angle to the steered wheel. Accordingly, the power required for the driver to operate the steering wheel can be reduced. At the time of transmission of the rotational driving power, a contact pressure between the driving and driven frictional surfaces is secured by the operation of the loading cam device and the backup of the idler disc, so that the transmission of the rotational driving power can be carried out between the both frictional surfaces with efficiency.

The gear ratio obtained by the transmission of the present invention constituted by the driving roller and the driven disc corresponds to a ratio between the diameter of the driving frictional surface and the diameter of the driven frictional surface. In the case of the frictional transmission which is assembled in the electric power steering apparatus of the present invention, since both of the driving and driven rotary shafts are arranged in the directions in which the central axes of these two rotary shafts are crossing each other, the diameter of the driving frictional surface and that of the driven frictional surface can be set freely. Since, since the diameter of the driving frictional surface can be set considerably small, it is possible to realize an electric power steering apparatus with a high energy efficiency and an excellent responding performance in a small size by attaining a small-sized frictional transmission which is capable of obtaining a large gear ratio by setting the ratio between the diameter of the driving frictional surface and that of the driven frictional surface to be large, especially without increase of the cost.

BRIEF DESCRIPTION OF THE DRAWINGS

FIG. 18 is a diagram for showing an electric power steering system which incorporates an electric power steering apparatus to be attained by the present invention.

DESCRIPTION OF THE PREFERRED EMBODIMENTS

Figure 1:
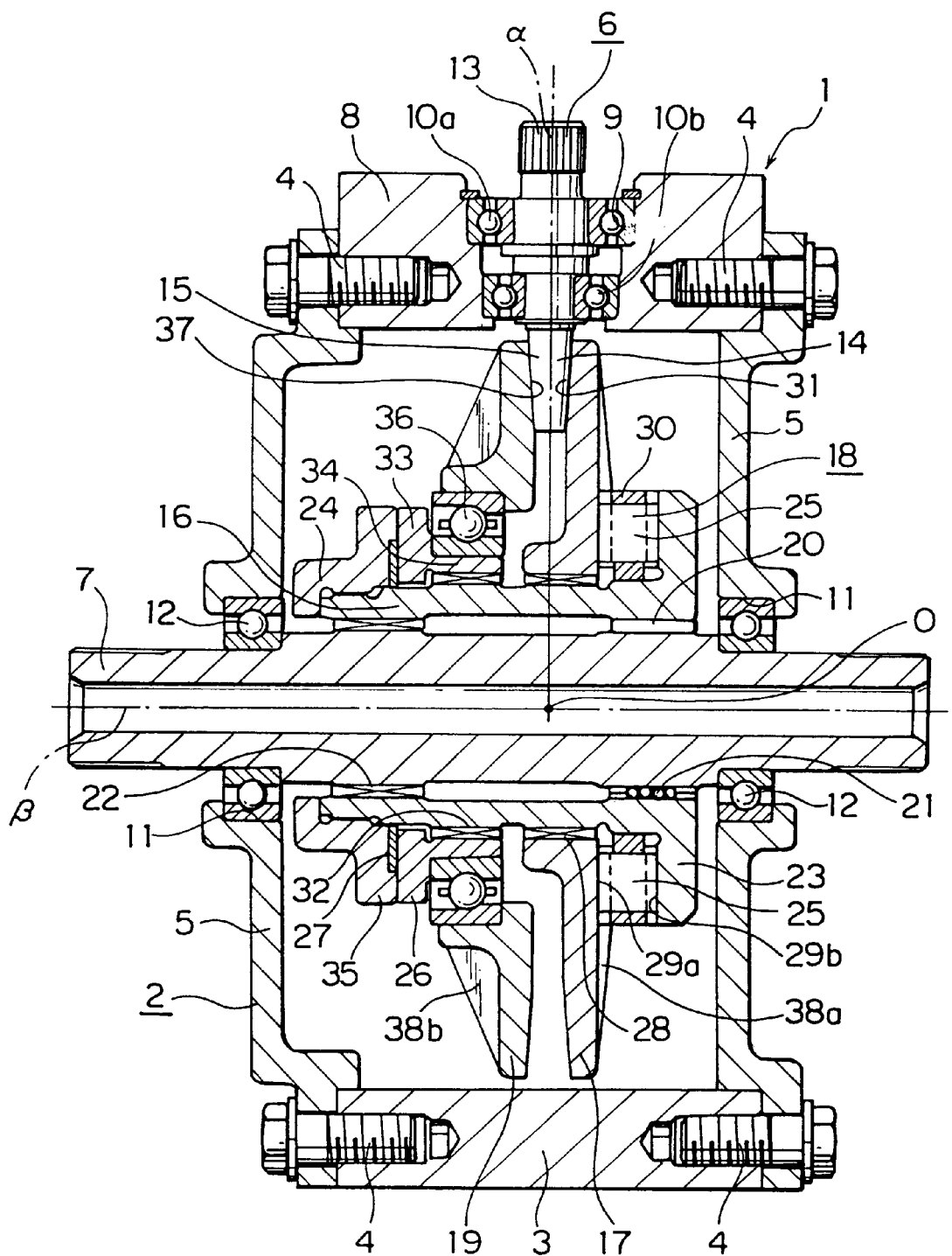
FIG. 1 is a cross-sectional view for showing a first embodiment of the present invention.

FIG. 1 illustrates a first embodiment of the present invention. Referring to FIG. 1, a frictional transmission 1 is provided with a casing 2. This casing 2 is comprised of a main portion 3 and a pair of covers 5, 5, which are connected and fixed to the opposite ends of the main portion 3 respectively by means of bolts 4, 4, for covering openings at the ends of the main portion 3. In such casing 2, an input shaft 6 and an output shaft 7 are disposed in directions in which the central axes of the shafts are crossing each other to be rotatably supported.

A thick mount portion 8 is disposed in a part of the main portion 3 for supporting the input shaft 6, and a first mount hole 9 is formed in this mount portion 8 along the radial direction of this main portion 3. The input shaft 6 is rotatably supported by a pair of rolling bearings 10a, 10b in the first mount hole 9. As these rolling bearings 10a, 10b, bearings which can support not only a radial load, but also a thrust load, such as ball bearings of deep-groove type or angular type, are used. Thus, the input shaft 6 is supported to be capable of rotation only (incapable of displacement in the axial direction) inside the first mount hole 9.

Also, second mount holes 11, 11 are formed respectively in the central portions of the pair of end plates 5, 5 to be coaxial with each other, for supporting the output shaft 7. Inside these second mount holes 11, 11, an intermediate portion of the output shaft 7 is rotatably supported by a pair of rolling bearings 12, 12. Also as these rolling bearings 12, 12, bearings which can support not only a radial load, but also a thrust load, such as ball bearings of deep-groove type or angular type, are used. However, these rolling bearings need not necessarily be arranged to be capable of supporting the thrust load. The output shaft 7 is thus supported to be capable of rotation only (incapable of displacement in the axial direction) inside the second mount holes 11, 11. In a state that the input shaft 6 and the output shaft 7 are thus supported in the casing, the central axis α of the input shaft 6 and the central axis β of the output shaft 7 are crossing at the point O on the central axis β of this output shaft 7.

In a portion protruding outward in the radial direction from the outer surface of the main portion 3 at the base end portion (the upper end portion in FIG. 1) of the input shaft 6, a spline portion 13 is provided to rotate the input shaft 6 by means of an unrepresented drive shaft. To a portion at the leading end portion (the lower end portion in FIG. 1) of the input shaft 6 exposed on the inner surface side of the main portion 3, an input roller 14 is connected and fixed integrally with the input shaft 6. Note that the input roller 14 and the input shaft 6 may be formed as a unitary unit. This input roller 14 is formed in a tapering conical form which has a smaller outer diameter at a part nearer the leading end thereof. This input roller 14 is disposed coaxially with the input shaft 6 and rotates together with the input shaft 6. Then, a conical convex surface coaxial with the input shaft 6 for forming the outer peripheral surface of such input roller 14 is made an input frictional surface 15. Note that lines extended from the generatrices of this input frictional surface 15 are crossing at the point O on the central axis β of the output shaft 7.

On the other hand, an output disc 17, a loading cam device 18 and an idler disc 19 are provided through a cylindrical sleeve 16 in the environs of a portion in a middle portion of the output shaft 7 located inside the casing 2. The sleeve 16 has a cylindrical form as a whole, and the inner peripheral surface of one end thereof (the right end portion in FIG. 1) is engaged with the outer peripheral surface of the middle portion of the output shaft 7 by means of a spline 20 (see the upper part in FIG. 1) or a ball spline 21 (see the lower part in FIG. 1). Note that though both of the spline 20 and the ball spline 21 are shown in this drawing for convenience of description, only one of them is provided between the inner peripheral surface of the one end of the sleeve 16 and the outer peripheral surface of the middle portion of the output shaft 7 in reality. There is also provided a bearing 22 for supporting a radial load only (not for supporting a thrust load), such as a sliding bearing, a radial needle bearing, or the like, between the inner peripheral surface of the other end (the left end in FIG. 1) of the sleeve 16 and the outer peripheral surface of the middle portion of the output shaft 7. Accordingly, the sleeve 6 is supported in the environs of the output shaft 7 to be freely rotatable in synchronism with this output shaft 7 and freely displaceable in the axial direction of the output shaft 7. Note that a spline or a ball spline may be provided, instead of the bearing 22.

A cam plate portion 23 for forming the loading cam device 18 is disposed on the outer peripheral surface of one end of the sleeve 16 as described above in the form of an outward flange which is formed with the sleeve 16 as a unitary unit. Also, a loading nut 24 is threadably fixed to the outer peripheral surface of the other end of the sleeve 16. Between this loading nut 24 and the cam plate portion 23, there are provided rollers 25, 25 for constituting the loading cam device 18, the output disc 17, a holder 26, and a coned disc spring 27 serving as a pressurization spring, in that order from the side of the cam plate portion 23 in series along the axial direction of the sleeve 16.

The output disc 17 is supported concentrically with the sleeve 16 in the environs of the middle portion of the sleeve 16 by means of a bearing 28 which supports a radial load only, such as a sliding bearing, a radial needle bearing, or the like. Cam surfaces 29a, 29b which are respectively convex and concave surfaces are provided in a part little closer to the inner diameter of one surface (the right surface in FIG. 1) of such output disc 17 and in one surface (the left surface in FIG. 1) of the cam plate portion 23, respectively, along the circumferential directions thereof. By and between these cam surfaces 29a, 29b, the rollers 25, 25 are sandwiched in such a manner that the central axes thereof are aligned with the radial directions of the cam plate portion 23 and the output disc 17 to be rotatably retained by a retainer 30. With this arrangement, while the output disc 17 is pressed to be separated away from the cam plate portion 23, the transmission of a rotational force is carried out between the sleeve 16 and the output disc 17.

Figure 7:
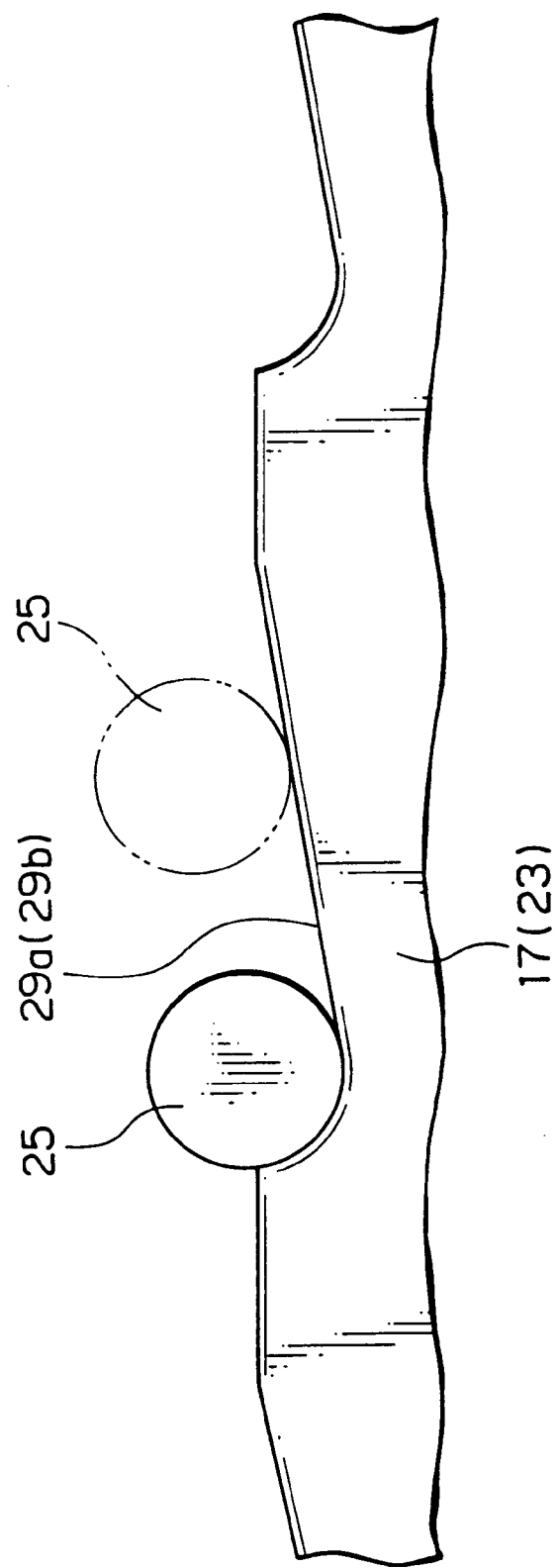
FIG. 7 is a developed view for showing an example of a cam surface for restricting a direction of rotation.

Note that the forms of both of the cam surfaces 29a, 29b are determined in accordance with a direction of rotational force to be transmitted. That is, when rotation in both directions is to be transmitted, the forms of the cam surfaces 29a, 29b are set to be symmetrical with respect to the circumferential direction thereof. On the other hand, when the rotation only in one direction is to be transmitted, these forms are determined to be asymmetrical, as shown in FIG. 7, for example, so that the rollers 25, 25 run idle while positioned at the most sunken portions of the cam surfaces in the case of the rotation in the other direction. That is, when only the rotation in one direction is to be transmitted, the form of the cam surface 29a (29b) is arranged to have an inclined part only in one rotational direction from the most sunken portion. If the cam surfaces 29a, 29b having such forms are employed, the power transmission is carried out when the cam surface 29a (29b) is displaced in the left direction in FIG. 7 with respect to the roller 25, while the cam surface may have a function of a one-way clutch for intercepting the power transmission when the cam surface is shifted in the right direction.

Further, an output frictional surface 31 is formed in a part a little closer to the outer diameter of the other surface (the left surface in FIG. 1) of the output disc 17. This output frictional surface 31 has a contact surface with the input frictional surface 15, which contact surface is a conical convex surface parallel to this input frictional surface 15. The generatrices of these frictional surfaces 31, 15 are brought into uniform contact with each other substantially along the entire length of these generatrices. Note that extended lines from the generatrices of the input frictional surface 15 are most preferably crossing the point O on the central axis β of the output shaft 7, as described above, for setting a spin in the contact portion between the frictional surfaces 31, 15 to be 0. At least it is preferable that the extended lines are crossing in the vicinity of the central axis β. It is also preferable for realizing a stable contact state without generating an edge load in the contact portion between the frictional surfaces 31, 15 that one of the cross sections of the frictional surfaces 31, 15 (the forms of the generatrices) is linear and the other is a convex surface having a large radius of curvature.

The holder 26 is supported by a bearing 32 for supporting a radial load only, such as a sliding bearing, a radial needle bearing, or the like, concentrically with the sleeve 16 in the environs of the middle portion of the sleeve 16. The holder 26 is formed to have an annular shape as a whole with a substantially L-shaped-cross section, having a circular portion 33 and a cylinder portion 34. The holder 26 is disposed on the environs of the middle portion of the sleeve 16 in such a manner that the circular portion 33 is placed to face the loading nut 24. It should be noted that an annular protrusion 35 is formed in a part which is a little closer to the outer diameter of this loading nut 24 and faces the circular portion 33. Then, a coned disc spring 27 is provided between the loading nut 24 and the circular portion 33 in a part closer to the inner diameter than this protrusion 35. The height of the protrusion 35 is smaller than the thickness of the disc spring 27 in its free state, but larger than the thickness of the disc spring 27 at its most compressed state.

Further, in the environs of the holder 26, the idler disc 19 is supported by the angular-type ball bearing 36 concentrically with the sleeve 16 and the holder 26 to be relatively rotatable with respect to the sleeve 16 and the holder 26. Accordingly, the idler disc 19 is rotatably supported to have a sufficient thrust rigidity and radial rigidity with respect to the holder 26. A backup surface 37 is formed in a half part close to the outer diameter of one surface (the right surface in FIG. 1) of the idler disc 19. This backup surface 37 is a conical convex surface which is parallel to the input frictional surface 15 formed on the input roller 14, and is brought into uniform contact with the generatrices of this input frictional surface 15 in a portion on the opposite side to the output frictional surface 31 on the output disc 17 substantially along the entire length of the generatrices.

Note that reinforcing ribs 38a, 38b are formed on one surface of the output disc 17 and the other surface of the idler disc 19, namely, the surfaces respectively opposite to the surfaces on which the output frictional surface 31 and the backup surface 37 are formed, along the radial directions thereof. These reinforcing ribs 38a, 38b serve to respectively enhance the flexural rigidity of the output disc 17 and that of the idler disc 19 so as to bring the input frictional surface 15 into uniform contact with the output frictional surface 31 and the backup surface 37 substantially along the entire length of the generatrices of this input frictional surface 15 when the power is transmitted by the frictional transmission.

The frictional transmission according to the embodiment of the present invention having the above structure transmits the rotational force from the input shaft 6 to the output shaft 7 by means of the following functions. When the input shaft 6 and the input roller 14 are rotated by an unrepresented drive shaft, the output disc 17 is rotated in accordance with the frictional engagement between the input frictional surface 15 and the output frictional surface 31. The rotation of this output disc 17 is transmitted to the sleeve 16 through the loading cam device 18, and then, the rotation of this sleeve 16 is transmitted to the output shaft 7 through the spline 20 or the ball spline 21. The input frictional surface 15 and the output frictional surface 31 are in pressure contact with a certain degree of contact pressure from the first stage in accordance with the elasticity of the disc spring 27. Accordingly, the transmission of the rotational force from the input shaft 6 to the output shaft 7 is efficiently carried out with no slip from the first stage.

When the rotational force is thus transmitted from the input shaft 6 to the output shaft 7, the loading cam device 18 presses the output disc 17 toward the input roller 14 while transmitting this rotational force. A load for thus pressing the output disc 17 toward the input roller 14 is required to be larger as a torque transmitted from the input shaft 6 to the output shaft 7 is larger. Accordingly, with sophisticated forms of the cam surfaces 29a, 29b for constituting the loading cam device 18, it is possible to optimize a value of the pressure for contact between the input frictional surface 15 and the output frictional surface 31 so as to carry out the transmission of the rotational force from the input shaft 6 to the output shaft 7 with efficiency. Also, as stated above, since the extended lines from the generatrices of the input frictional surface 15 are made to cross at the point O on the central axis β of the output shaft 7 or in the vicinity thereof, it is possible to carry out an efficient transmission of the rotational force with no slip in the contact portion between the input frictional surface 15 and the output frictional surface 31.

Moreover, a part of the input frictional surface 15 provided on the outer peripheral surface of the input roller 14 opposite to the contact portion with the output frictional surface 31 in the radial direction is brought into pressure contact with the backup surface 37. Accordingly, if the loading cam device 18 presses the output disc 17 upon the input roller 14, this input roller 14 is not retracted from the output disc 17. Consequently, the pressure of contact between the input frictional surface 15 and the output frictional surface 31 brought by the loading cam device 18 can be secured without fail. Note that the idler disc 19 is rotated at the same speed as that of the output disc 17 in the opposite direction to the output disc 17 during operation of the transmission.

A variable gear ratio realized by the frictional transmission of the present invention as described above (a speed reducing ratio in the above description) correspond to a ratio of the diameter of the input frictional surface 15 to the diameter of the output frictional surface 31. In the case of the frictional transmission of the present invention, since the input shaft 6 and the output shaft 7 are arranged in directions in which the central axes of these shafts 6 and 7 are crossing, the diameter of the input frictional surface 15 and that of the output frictional surface 31 can be set freely. Especially, as shown in the drawing, for example, it is also possible to set the diameter of the input frictional surface 15 to be considerably small. Consequently, it is possible to realize a small-sized frictional transmission which can obtain a large gear ratio by increasing a ratio between the diameter of the input frictional surface 15 and that of the output frictional surface 31. Note that the above description is applied to a case in which the transmission of the present invention is used as a speed reducing device. However, the transmission of the present invention can be used also as a speed increasing device as it is. That is, if the input shaft and the output shaft are arranged in the opposite way, the transmission can function as it is as a speed increasing device.

Figure 2:
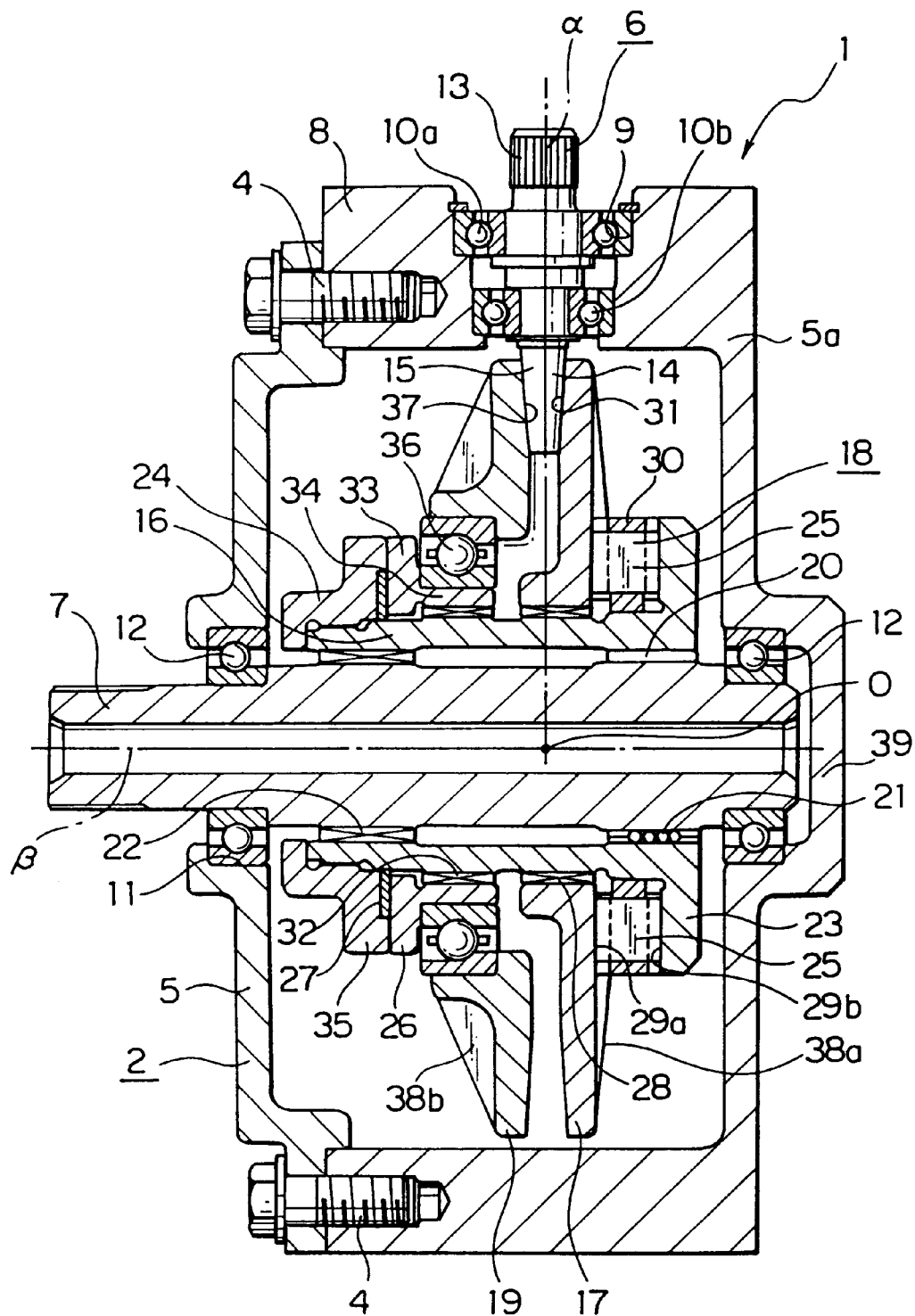
FIG. 2 is a cross-sectional view for showing a second embodiment of the present invention.

Next, FIG. 2 illustrates a second embodiment of the present invention. In the first embodiment described above, the output shaft 7 is protruded from both sides of the casing 2 so that an output can be obtained from the both sides of the casing 2. On the other hand, in the present embodiment, the output shaft 7 is protruded only from one side of the casing 2 (the left side in FIG. 2) so that an output can be obtained only from one side of the casing 2. As a result, in the present embodiment, a cylindrical support portion 39 is disposed in the central part of one of the end plates 5a (the right one in FIG. 2), and one end (the right end in FIG. 2) of the output shaft 7 is rotatably supported inside this support portion 39. Other arrangements and operations of the second embodiment are the same as those of the first embodiment so that the same reference numbers are given to the portions identical to those of the first embodiment. Thus, description thereof will be omitted.

Figure 3:
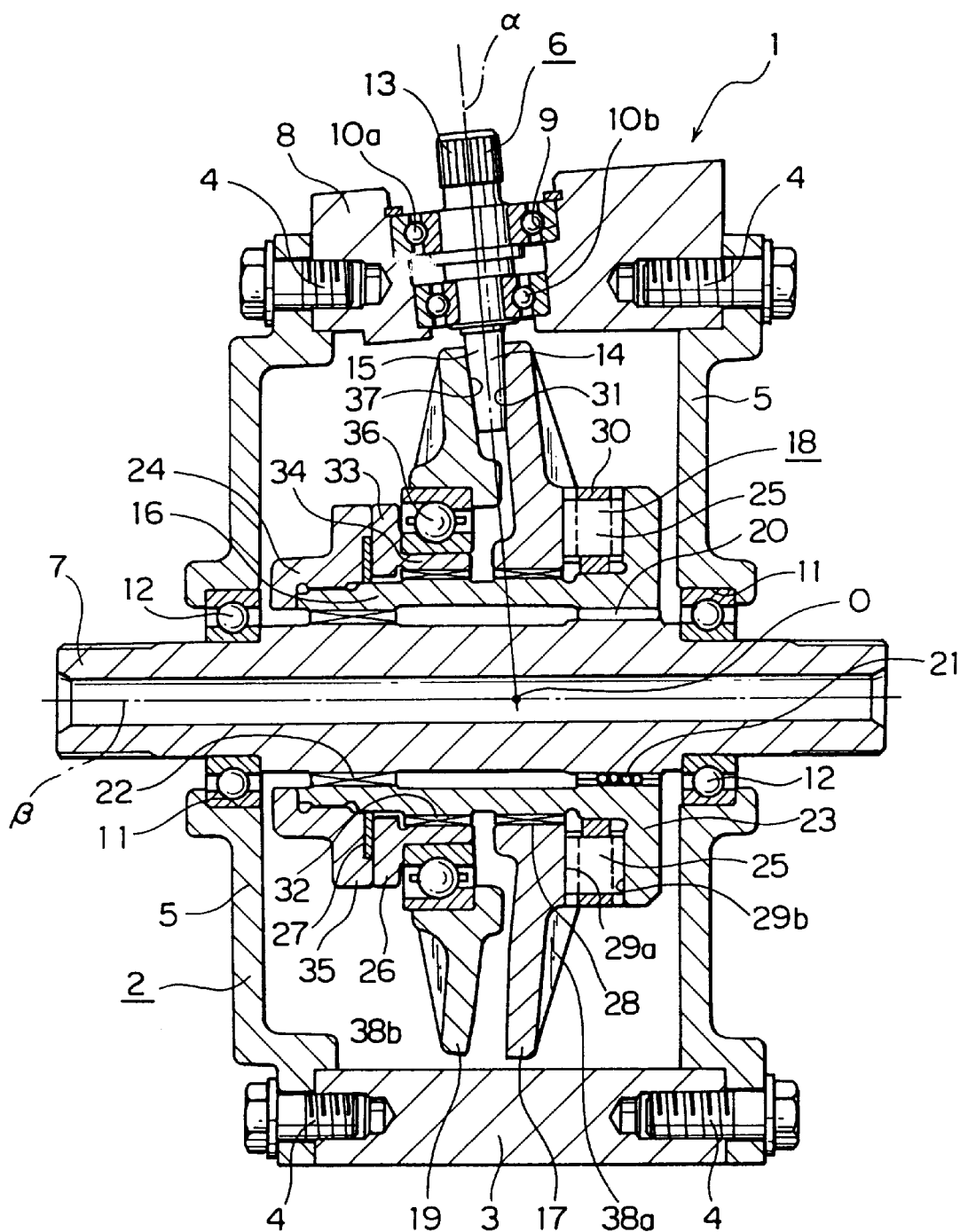
FIG. 3 is a cross-sectional view for showing a third embodiment of the present invention.

Next, FIG. 3 illustrates a third embodiment of the present invention. While the central axis α of the input shaft 6 and the central axis β of the output shaft 7 are crossing at right angles in the above-described first embodiment, the central axis α of the input shaft 6 and the central axis β of the output shaft 7 are crossing in an inclined manner in this second embodiment. Since the other arrangements and the operations of the second embodiment, including the arrangement that at the extended lines of the generatrices of the input frictional surface 15 are crossing at the point O on the central axis β of the output shaft 7, are the same as those in the above-described first embodiment, the same reference numbers are given to the portions identical to those in the first embodiment and description thereof will be omitted.

Figure 4:
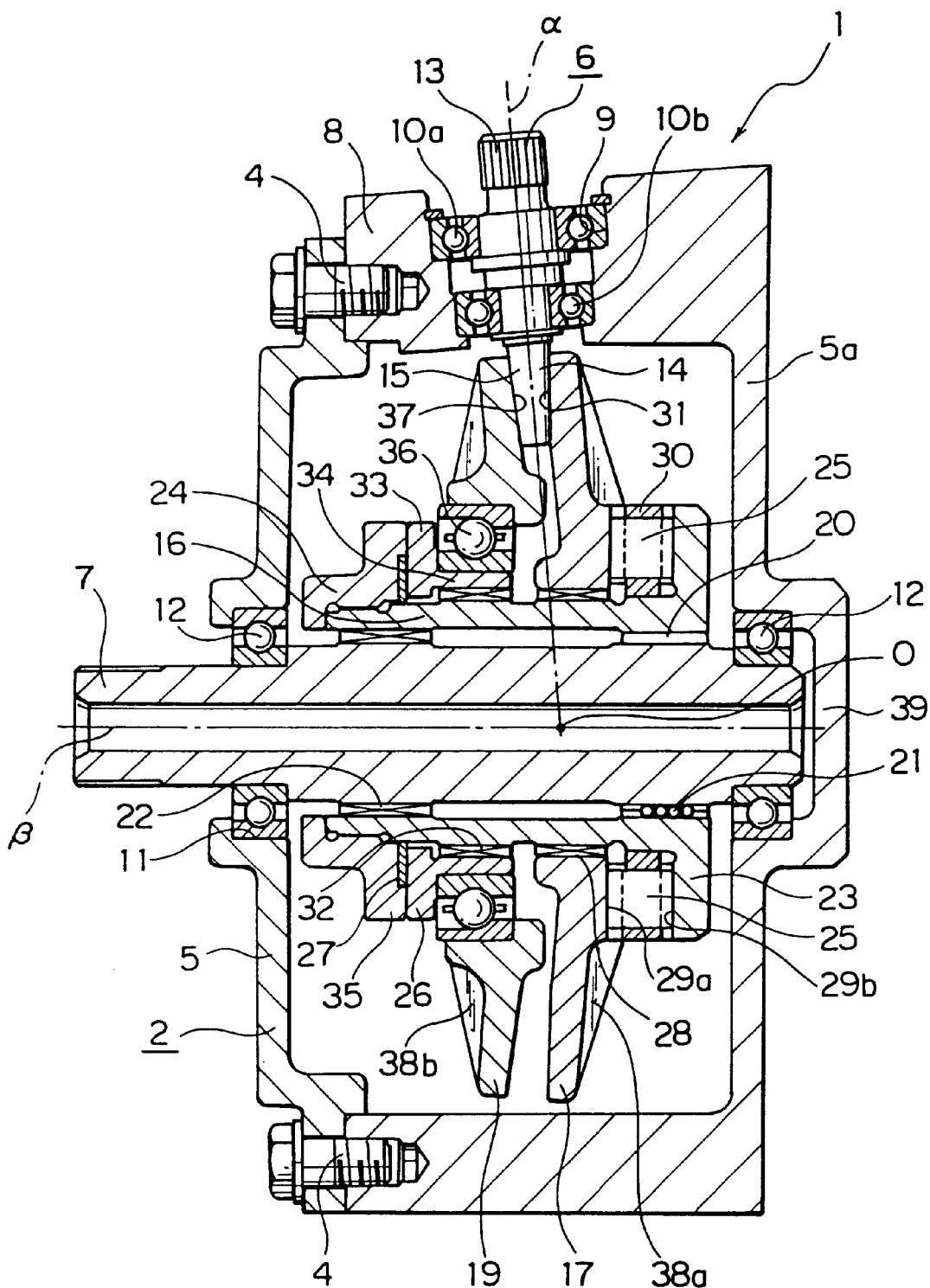
FIG. 4 is a cross-sectional view for showing a fourth embodiment of the present invention.

FIG. 4 illustrates a fourth embodiment of the present invention. In the present embodiment, the output shaft 7 is protruded only from one side of the casing 2 (the left side in FIG. 4), so that an output can be obtained only from this one side of the casing 2. As a result, in the present embodiment, the cylindrical support portion 39 having the bottom is disposed in the central part of one of the end plates 5a (the right one in FIG. 4), and one end (the right end in FIG. 4) of the output shaft 7 is rotatably supported inside this support portion 39. Other arrangements and operations of the second embodiment are the same as those of the third embodiment described above so that the same reference numbers are given to the portions identical to those of the third embodiment. Thus, description thereof will be omitted.

Figure 5:
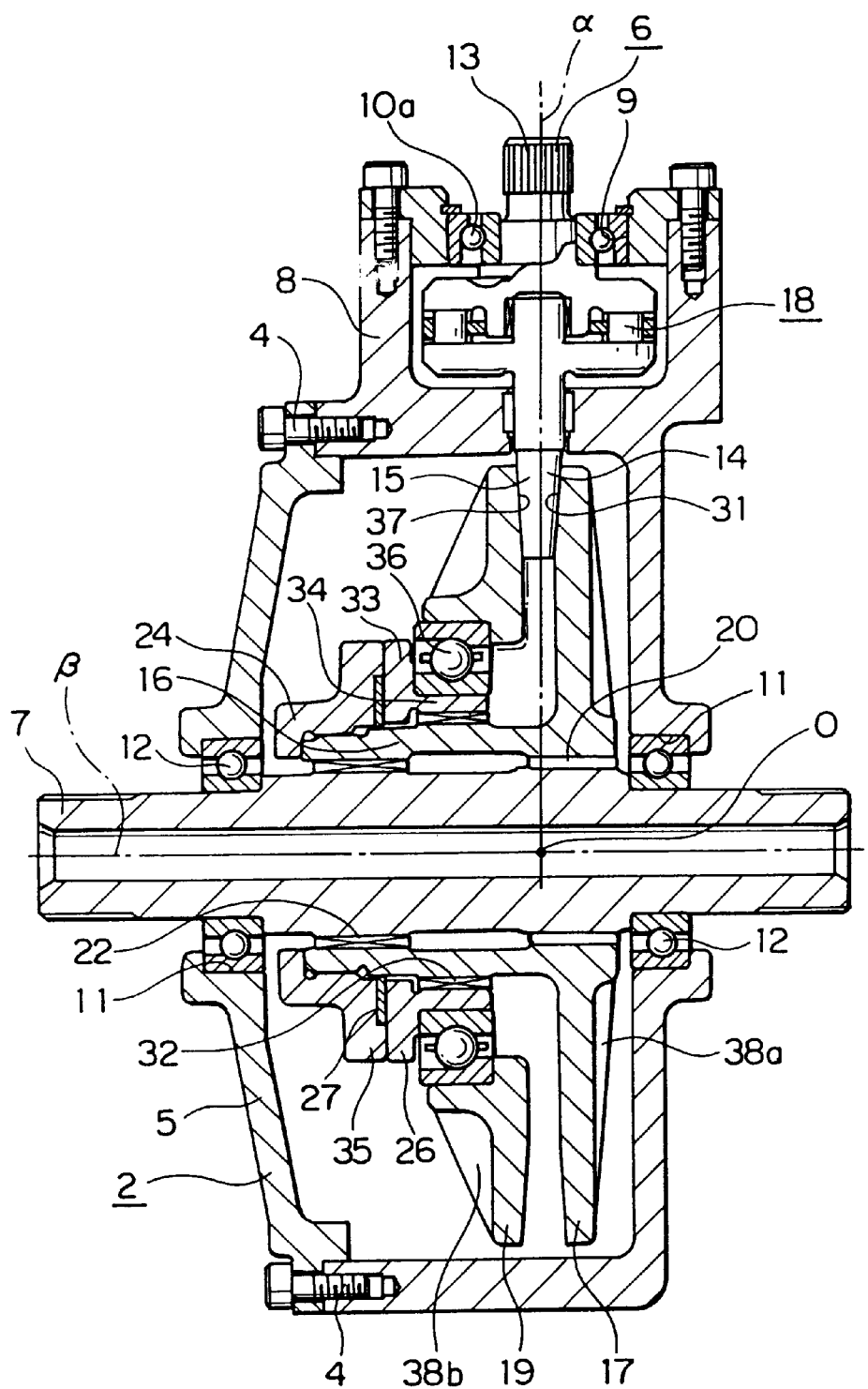
FIG. 5 is a cross-sectional view for showing a fifth embodiment of the present invention.

Next, FIG. 5 illustrates a fifth embodiment of the present invention. In each of the foregoing embodiments, the loading cam device 18 is disposed between the output shaft 7 and the output disc 17. On the other hand, in the present embodiment, the loading cam device 18 is provided between the input shaft 6 and the input roller 14. When the loading cam device 18 is provided between the input shaft 6 and the input roller 14 as described above, the input roller 14 is inserted between the output disc 17 and the idler disc 19 in a wedge-like manner upon operation of this loading cam device. Accordingly, even when a thrust (a pressing force in the axial direction) generated by the loading cam device 18 is not especially large, a contact pressure between the input frictional surface 15 and the output frictional surface 31 can be secured. Consequently, it is possible to reduce the sizes and the weights of the loading cam device 18 and the frictional transmission incorporating this loading cam device 18 therein. Since other arrangements and operations of the fifth embodiment are the same as those of the first embodiment described above, the same referential numerals are given to the portions identical to those of the first embodiment, and description thereof will be omitted.

Figure 6:
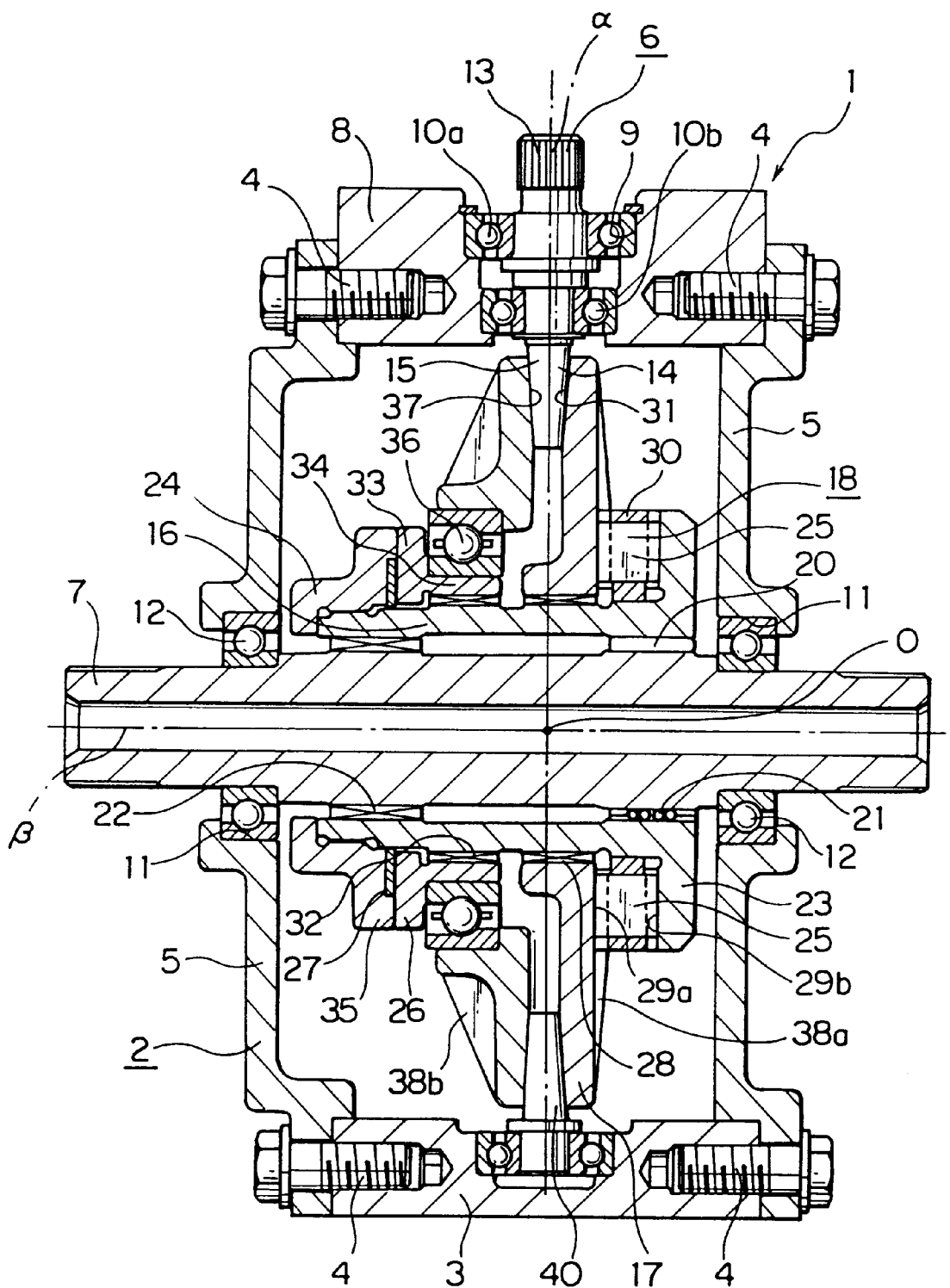
FIG. 6 is a cross-sectional view for showing a sixth embodiment of the present invention.

Next, FIG. 6 illustrates a sixth embodiment of the present invention. In the present embodiment, an idler roller 40 having the same form as that of the input roller 14 is provided in a part on the side opposite to the input roller 14 with respect to the output shaft 7. This idler roller 40 is disposed substantially coaxially with this input roller 14 and is rotatably supported inside the casing 2 while sandwiched by and between the output frictional surface 31 and the backup surface 37. The output disc 17 and the idler disc 19 sandwich the input roller 14 and the idler roller 40 therebetween which are positioned on the opposite sides in the radial direction, at the time of operation of the frictional transmission. For this reason, it is possible to stabilize an operational condition of the frictional transmission by setting a distribution of a stress acting on the output disc 17 in the circumferential direction to be substantially uniform. Since other arrangements and operations of the present embodiment are the same as those of the first embodiment described above, the same referential numerals are given to the portions identical to those of the first embodiment, and a description thereof will be omitted.

Since each of the foregoing embodiments is constituted and operated as described above, it is possible to constitute a small-sized frictional transmission having a large gear ratio with no backlash. Consequently, it is possible to reduce the size of mechanical devices of various kinds incorporating the transmission therein and to enhance the performance thereof. It is also possible to obtain an excellent transmission efficiency from the initial stage immediately after the start of transmission of the rotational driving force without generating a slip between the frictional surfaces.

FIG. 18 schematically shows a basic structure of a power steering system which employs an electric power steering apparatus of the present invention to be described next.

Referring to FIG. 18, in a middle portion of a steering shaft 102 which is rotated in accordance with an operation of a steering wheel 101, there are provided a torque sensor 103 for detecting the direction and the magnitude of a torque applied from this steering wheel 101 onto the steering shaft 102, and a speed reducing device 104. An output side of this speed reducing device 104 is connected to the middle portion of the steering shaft 102, while the input side thereof is connected to the output shaft of an electric motor 105. A detection signal of the torque sensor 103 is supplied to a control unit 106 for controlling the energization to the electric motor 105, together with a signal indicative of a car speed. A worm speed reducing device having a large lead angle and reversibility with respect to a direction of power transmission was conventionally used as the speed reducing device. In such a device, a worm wheel serving as a rotational force receiving member is fixed to the middle portion of the steering shaft 102, and a worm which serves as a rotational force applying member and is connected and fixed to the output shaft of the electric motor 105 is engaged with the worm wheel.

In order to give a steering angle to the steering wheel, the steering wheel 101 is operated, and the torque sensor 103 detects a direction or rotation and a torque of this steering shaft 102 when the steering shaft 102 is rotated so as to send a signal indicative of a value detected by the sensor to the control unit 106. Then, this control unit 106 energizes the electric motor 105 to rotate the steering shaft 102 in the same direction as a direction of rotation in accordance with the steering wheel 101 through the speed reducing device 104. As a result, the leading end portion of the steering shaft 102 (the lower end portion in FIG. 11) is rotated at a larger torque than that based on the torque given from the steering wheel 101.

Such rotation of the leading end portion of the steering shaft 102 is transmitted to an input shaft 110 of a steering gear 109 through universal joints 107a, 107b, and an intermediate shaft 108. This input shaft 110 causes a pinion 111 for constituting the steering gear 109 to rotate, pushes or pulls a tie rod 113 by means of a rack 112, and gives a vehicle wheel 114 a desired steering angle. As clearly seen from the above description, the torque transmitted from the leading end portion of the steering shaft 102 to the intermediate shaft 108 through the universal joints 107a, 107b is larger than the torque given from the steering wheel 101 to the base end portion of the steering shaft 102 (the upper end portion in FIG. 18) by an amount corresponding to an auxiliary power given from the electric motor 105 through the speed reducing device 104. Accordingly, a force required for the driver to operate the steering wheel 101 for giving the steering angle to the vehicle wheel 114 can be reduced to the extent corresponding to the auxiliary power.

Figure 8:
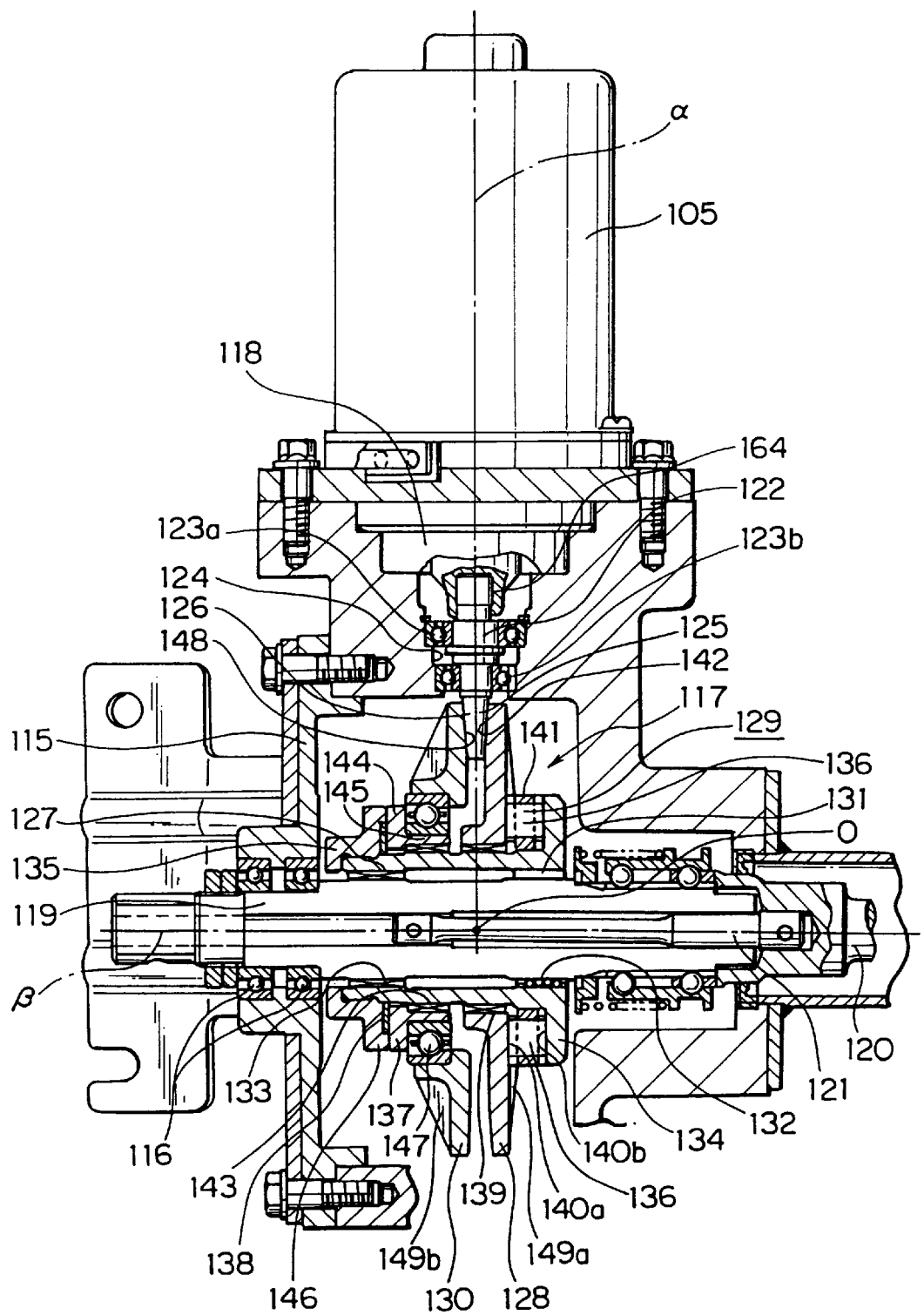
FIG. 8 is a cross-sectional view partially cut-away for showing a seventh embodiment of the present invention.

FIG. 8 shows an electric power steering apparatus according to a seventh embodiment of the present invention. A main rotary shaft 119 which is rotated and driven by the steering shaft 102 (see FIG. 18) through a transmission shaft 120 and a torsion bar 121, which are to be described later, in accordance with an operation of the steering wheel 101 (which is omitted in FIG. 8; see FIG. 18) is inserted in a housing 115, and supported to be capable of rotation only (incapable of displacement in the axial direction) by rolling bearings, such as deep-groove type ball bearings 116, 116, at one end (the left end in FIG. 8) with respect to this housing 115. Also, an electric motor 105 is provided on one side of the housing 115 (in an upper part in FIG. 8), and a rotational driving force of this electric motor 105 is decelerated by a speed reducing device 117, which is to be described later, to be transmitted to the main rotary shaft 119. Note that an electromagnetic clutch 118 is disposed between an auxiliary rotary shaft 122, which serves as an input unit of the speed reducing device 117 and is described later, and an output shaft of the electric motor 105. This electromagnetic clutch 118 intercepts the connection between the auxiliary rotary shaft 122 and the output shaft of the electric motor 105 if the electric motor 105 has a trouble and becomes incapable of rotating due to burning out or the like. At the other end of the main rotary shaft 119 (the right end in FIG. 8), the transmission shaft 120 is disposed coaxially with this main rotary shaft 119, and the main rotary shaft 119 and the transmission shaft 120 are connected to each other through the torsion bar 121. A rotation of this main rotary shaft 119 is transmitted to the input shaft 110 of the steering gear 109 through the universal joints 107a, 107b and the intermediate shaft 108, so as to give a steering angle corresponding to an amount of rotation to the vehicle wheel 114 (see FIG. 18).

The speed reducing device 117 is disposed on the middle portion of the main rotary shaft 119 inside the housing 115. In order to constitute the speed reducing device 117, the auxiliary rotary shaft 122 is rotatably supported by a pair of rolling bearings 123a, 123b on one side of the housing 115. As these rolling bearings 123a, 123b, deep-groove type ball bearings or angular-type ball bearings which can support a thrust load, in addition to a radial load, are used. Thus, the auxiliary rotary shaft 122 is supported inside a mount hole 124 which is formed on a side of the housing 115 to be capable of rotation only (incapable of displacement in the axial direction). In such state that the auxiliary rotary shaft 122 and the main rotary shaft 119 are supported on the housing 115 as stated above, the central axis α of the auxiliary rotary shaft 122 and the central axis β of the main rotary shaft 119 are crossing at the point O on the central axis β of the main rotary shaft 119.

A spline portion 164 is disposed in the base end portion of the auxiliary rotary shaft 122 (the upper end portion in FIG. 8), and this spline portion 164 and an output portion of the electromagnetic clutch 118 are brought into engagement so that the electric motor 105 can freely rotate and drive the auxiliary rotary shaft 122. To a portion at the leading end of the auxiliary rotary shaft 122 (the lower end portion in FIG. 8) exposed on the inner surface of the housing 115, a driving roller 125 is connected and fixed to the auxiliary rotary shaft 122 as a unitary unit. This driving roller 125 is formed to have a tapering conical shape which has the smaller outer diameter at a part closer to the leading end portion thereof, and is formed coaxially with the auxiliary rotary shaft 122 to be rotated together with this auxiliary rotary shaft 122. Such conical convex surface for constituting the outer peripheral surface of such driving roller 125 coaxially with the auxiliary rotary shaft 122 is called a driving frictional surface 126. The extended lines from the generatrices of this driving frictional surface 126 are crossing at the point O on the central axis β of the main rotary shaft 119.

In the environs of the middle portion of the main rotary shaft 119 inside the housing 115, there are provided a driven disc 128, a loading cam device 129, and an idler disc 130 through a cylindrical sleeve 127. The sleeve 127 is formed cylindrical as a whole, with the inner peripheral surface of one end (the right end portion in FIG. 8) engaged with the outer peripheral surface of the middle portion of the main rotary shaft 119 by means of a spline 131 (see the upper part in FIG. 8) or a ball spline 132 (see the lower part in FIG. 8).

Note that, though both of the spline 131 and the ball spline 132 are shown in the drawing for convenience of description, either one of them is disposed between the inner peripheral surface of the one end of the sleeve 127 and the outer peripheral surface of the middle portion of the main rotary shaft 119 in practice. Also, between the inner peripheral surface of the other end of the sleeve 127 (the left end portion in FIG. 8) and the outer peripheral surface of the middle portion of the main rotary shaft 119, there is provided a bearing 133 for supporting a radial load only (not for supporting a thrust load), such as a sliding bearing, a radial needle bearing, or the like. Accordingly, the sleeve 127 is supported to be rotatable in synchronism with the main rotary shaft 119 and displaceable in the axial direction of the main rotary shaft 119. A spline or a ball spline may be provided in place of this bearing 133.

A cam plate portion 134 for constituting the loading cam device 129 in an outward flange-like form integrally with the sleeve 127 is disposed on the outer peripheral surface of one end of the sleeve 127. Also, a loading nut 135 is threadably fixed to the outer peripheral surface of the other end of the sleeve 127. Between this loading nut 135 and the cam plate portion 134, there are provided rollers 136, 136 for constituting the loading cam device 129, the driven disc 128, a holder 137, and a coned disc spring 138 serving as a preload spring, in that order from the side of the cam plate portion 134 in series along the axial direction of the sleeve 127.

The driven disc 128 is supported concentrically with the sleeve 127 by a bearing 139 for supporting a radial load only, such as a sliding bearing, a radial needle bearing, or the like, in the environs of the middle portion of the sleeve 127. Cam surfaces 140a, 140b which are concave and convex surfaces along the circumferential directions are provided respectively in a part a little closer to the inner diameter of one surface of the driven disc 128 (the right surface in FIG. 8) and on one surface of the cam plate portion 134 (the left surface in FIG. 8). Each of the rollers 136, 136 is sandwiched by and between these cam surfaces 140a, 140b to have the central axis thereof aligned with the radial direction of the cam plate portion 134 or the driven disc 128 and to be rotatable by a retainer 141. The loading cam device 129 is constituted with this structure, for carrying out the transmission of a rotational force between the sleeve 127 and the driven disc 128, while pressurizing the driven disc 128 in a direction in which it is separated away from the cam plate portion 134. Note that the form of each of the cam surfaces 140a, 140b in the circumferential direction preferably has no flat surface at the apex of a risen part thereof and inclined surfaces with opposite directions of inclination arranged alternately. This is because each of the rollers 136, 136 possibly remains as it is at the apex when there is a flat surface at the apex and an excessive torque is supplied to the loading cam device 129, so that the rollers 136, 136 would ride on the apexes after this torque is extinguished.

A driven frictional surface 142 is formed in a part a little closer to the outer diameter of the other surface of the driven disc 128 (the left surface in FIG. 8). This driven frictional surface 142 has a contact portion with the driving frictional surface 126 which is a conical convex surface parallel with this driving frictional surface. The generatrices of both of the frictional surfaces 142, 126 are brought into uniform pressure contact with each other substantially along the entire length of these generatrices. It is preferable if the form of one of the generatrices of these frictional surfaces 142, 126 is linear, that the form of the other is a curved or a little bent in such a manner that the central part of this frictional surface becomes convex and having a large radius of curvature, since a stable contact condition can be realized without generating an edge load in the contact portion between the frictional surfaces 142, 126.

A holder 137 is supported by a bearing 143 also for supporting a radial load only, such as a sliding bearing, a radial needle bearing, or the like, concentrically with the sleeve 127 in the environs of the middle portion of the sleeve 127. The holder 137 is formed to have an annular shape as a whole with a substantially L-shaped cross section, having a circular portion 144 and a cylinder portion 145. Out of these components, the circular portion 144 is disposed in the environs of the middle portion of the sleeve so as to face the loading nut 135. It should be noted that an annular protrusion 146 is formed in a part which is a little closer to the outer diameter of this loading nut 135 and faces the circular portion 144. A coned disc spring 138 is provided between the loading nut 135 and the circular portion 144 in a part closer to the inner diameter than this protrusion 146. The height of the protrusion 146 is smaller than the thickness of the disc spring 138 in its free state, but is larger than the thickness of this disc spring 138 in its most compressed state. Consequently, even if a torque generated by the loading cam device 129 is large, the disc spring 139 is not completely crushed and the durability of this disc spring 139 is not deteriorated.

Further, in the environs of the holder 137, the idler disc 130 is supported by a rolling bearing 147 capable of supporting both a radial load and a thrust load, such as an angular-type ball bearing, a taper roller bearing, a bearing unit as a combination of radial and thrust rolling bearings, etc., concentrically with the sleeve 127 and relatively rotatably with respect to this sleeve 127. Then, a backup surface 148 is formed in a half part of one surface closer to the outer diameter (the right surface in FIG. 8) of the idler disc 130. This backup surface 148 has a contact portion with the driving frictional surface 126 which is a conical convex surface parallel to this driving frictional surface 126, and is brought into uniform contact with the generatrices of this driving frictional surface 126 substantially along the entire length thereof in a portion on the opposite side to the driven frictional surface 142. Note that the form of one of the generatrices of the backup surface 148 and the driving frictional surface 142 is preferably a curve having a large radius of curvature so as not to generate an edge load. Accordingly, the form of the generatrix of the driving frictional surface 142 preferably is the curve mentioned above.

Reinforcing ribs 149a, 149b are respectively formed on one surface of the driven disc 128 and the other surface of the idler disc 130, namely, the surfaces opposite to the surfaces on which the driven frictional surface 142 and the backup surface 148 are respectively formed, along the radial directions thereof. These reinforcing ribs 149a, 149b serve to enhance the flexural rigidity of the driven disc 128 and the idler disc 130 so as to bring the driving frictional surface 126, the driven frictional surface 142, and the backup surface 148 into uniform pressure contact substantially along the entire length of the generatrices of this driving frictional surface 126 when the power is transmitted by the frictional transmission.

The speed reducing device 117 of the electric power steering apparatus of the present invention having the above-described structure serves to transmit the rotational force from the auxiliary rotary shaft 122 to the main rotary shaft 119 in the following manner. When the driver operates the steering wheel 101 to rotate the transmission shaft 120 through the steering shaft 102, a rotational force is given from this transmission shaft 120 to the main rotary shaft 119 through the torsion bar 121. On this occasion, a phase along the direction of rotation between the transmission shaft 120 and the main rotary shaft 119 is shifted in accordance with an elastic deformation of this torsion bar 121. In accordance with a detection value from the torque sensor 103 (FIG. 18) based on this shift, the output shaft of the electric motor 105 is rotated with a magnitude and in a direction corresponding to the rotational force and the direction of rotation given from the steering wheel 101 to the main rotary shaft 119. When the auxiliary rotary shaft 122 and the driving roller 125 are rotated by the output shaft of such electric motor 105, the driven disc 128 is rotated in accordance with a frictional engagement between the driving frictional surface 126 and the driven frictional surface 142. The rotation of this driven disc 128 is transmitted to the sleeve 127 through the loading cam device 129, and then, the rotation of this sleeve 127 is transmitted to the main rotary shaft 119 through the spline connection thereof (see the spline 131 and the ball spline 132). This rotation of the main rotary shaft 119 is transmitted to the input shaft 110 of the steering gear 109 through the universal joints 107a, 107b and the intermediate shaft 108, so as to give a steering angle corresponding to an amount of the rotation to the steered wheel 114 (see FIG. 18). The driving frictional surface 126 and the driven frictional surface 142 are brought into pressure contact with a certain degree of contact pressure from the first stage in accordance with the elasticity of the coned disc spring 138. Accordingly, the transmission of the rotational force from the auxiliary rotary shaft 122 to the main rotary shaft 119 is efficiently carried out with no slip from the first stage.

When the rotational force is thus transmitted from the auxiliary rotary shaft 122 to the main rotary shaft 119, the loading cam device 129 presses the driven disc 128 toward the driving roller 125 while transmitting this rotational force. The load for thus pressing the driven disc 128 toward the driving roller 125 becomes larger as a torque transmitted from the auxiliary rotary shaft 122 to the main rotary shaft 119 is larger. Accordingly, with more sophisticated forms of the cam surfaces 140a, 140b for constituting the loading cam device 129, it is possible to optimize a value of the pressure for contact between the driving frictional surface 126 and the driven frictional surface 142, so as to carry out the transmission of the rotational force from the auxiliary rotary shaft 122 to the main rotary shaft 119 with efficiency. Also, as stated above, since the extended lines from the generatrices of the driving frictional surface 126 are made to cross at the point O on the central axis β of the main rotary shaft 119, it is possible to carry out an efficient transmission of a rotational force without no slip in the contact portion between the driving frictional surface 126 and the driven frictional surface 142.

Moreover, a part of the driving frictional surface 126 provided on the outer peripheral surface of the driving roller 125 opposite to the contact portion with the driven frictional surface 142 in the radial direction is brought into pressure contact with the backup surface 148 of the idler disc 130. Accordingly, if the loading cam device 129 presses the driven disc 128 upon the driving roller 125, this driving roller 125 is not retracted from the driven disc 128. Consequently, the pressure of contact between the driving frictional surface 126 and the driven frictional surface 142 brought by the loading cam device 129 can be secured without fail. Note that the idler disc 130 is rotated at the same speed as that of this driven disc 128 in the opposite direction to this driven disc 128 during the operation of the transmission.

A speed reducing ratio which can be realized by the speed reducing device 117 to be assembled in the electric power steering apparatus of the present invention as described above is a ratio between the diameter of the driving frictional surface 126 and the diameter of the driven frictional surface 142. In the case of the speed reducing device 117 mentioned above, since the auxiliary rotary shaft 122 and the main rotary shaft 119 are arranged in directions in which the central axes of these shafts 122 and 119 are crossing, the diameter of the driving frictional surface 126 and that of the driven frictional surface 142 can be set freely. Especially, for example, as shown in the drawing, it is also possible to set the diameter of the driving frictional surface 126 to be considerably small. Consequently, it is possible to realize a small-sized frictional speed reducing device which can obtain a large transmission ratio by increasing a ratio between the diameter of the driving frictional surface 126 and that of the driven frictional surface 142. Accordingly, even when the rotating speed of this electric motor 105 is accelerated to enhance the energy efficiency of the electric motor 105, it is possible to realize an electric power steering apparatus having an excellent responding performance without increasing the size of the structure.

Figure 9:
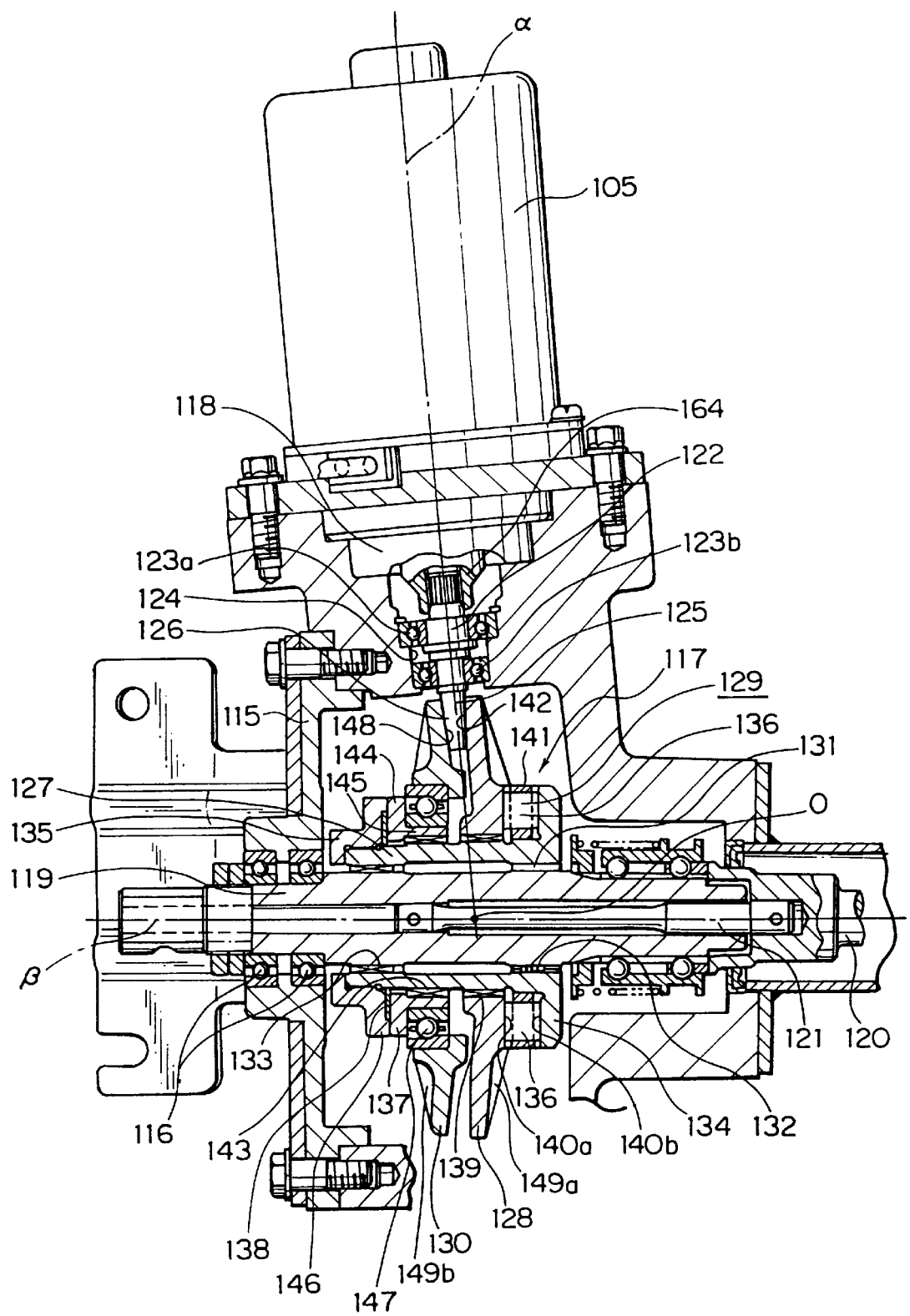
FIG. 9 is a cross-sectional view partially cut-away for showing an eighth embodiment of the present invention.

Next, FIG. 9 illustrates an eighth embodiment of the present invention. While the central axis α of the auxiliary rotary shaft 122 and the central axis β of the main rotary shaft 119 are crossing at right angles in the seventh embodiment described above, the central axis α of the auxiliary rotary shaft 122 and the central axis β of the main rotary shaft 119 are crossing in an inclined state in the present embodiment. Since the other structures and operations of the eighth embodiment including that the extended lines from generatrices of the driving frictional surface 126 are crossing at the point O on the central axis β of the main rotary shaft 119, together with the central axis α of the auxiliary rotary shaft 122, are the same as those of the seventh embodiment described above, the same reference numbers are given to the portions identical to those of the seventh embodiment, and a description thereof will be omitted.

Figure 10:
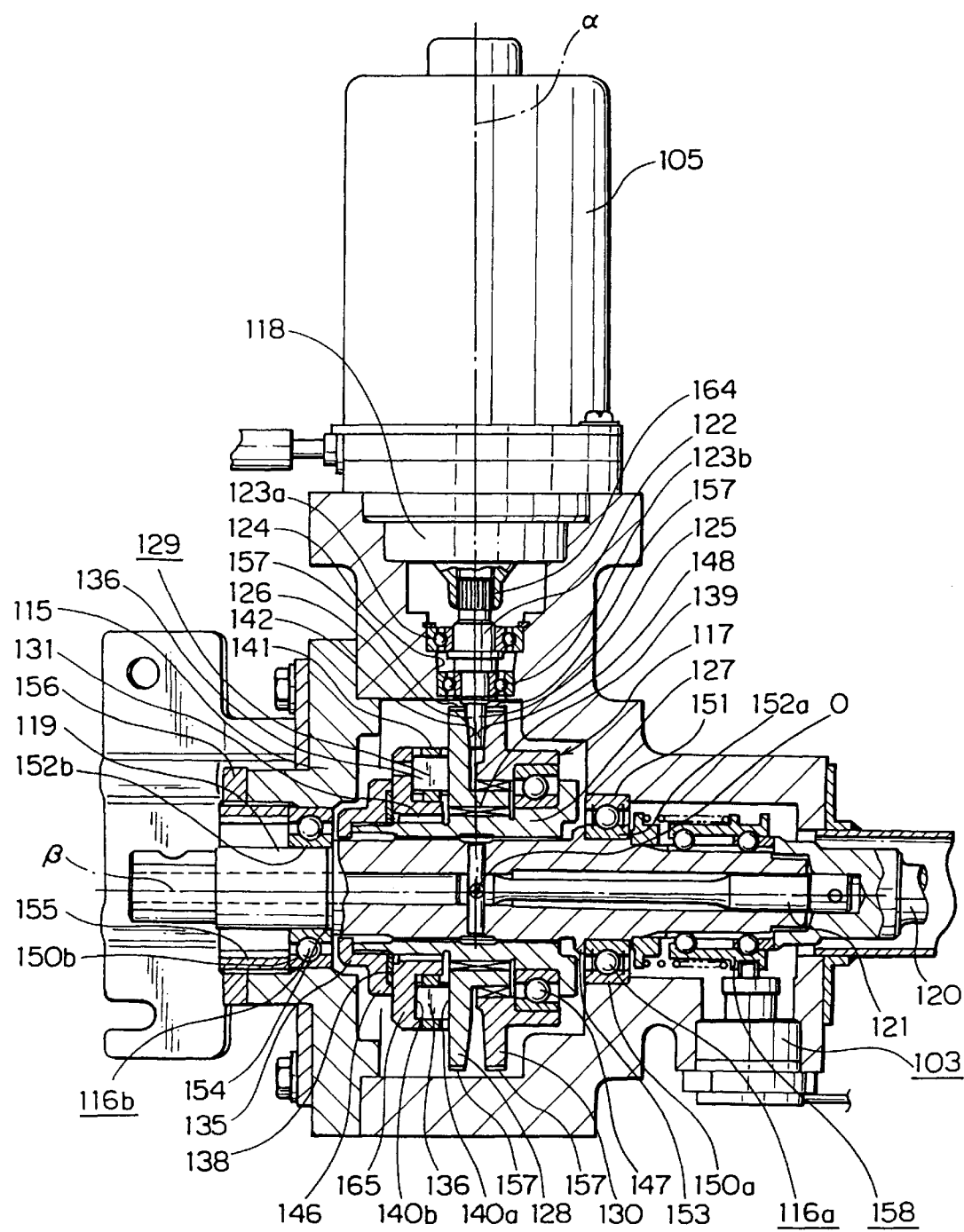
FIG. 10 is a cross-sectional view partially cut-away for showing a ninth embodiment of the present invention.
Figure 11:
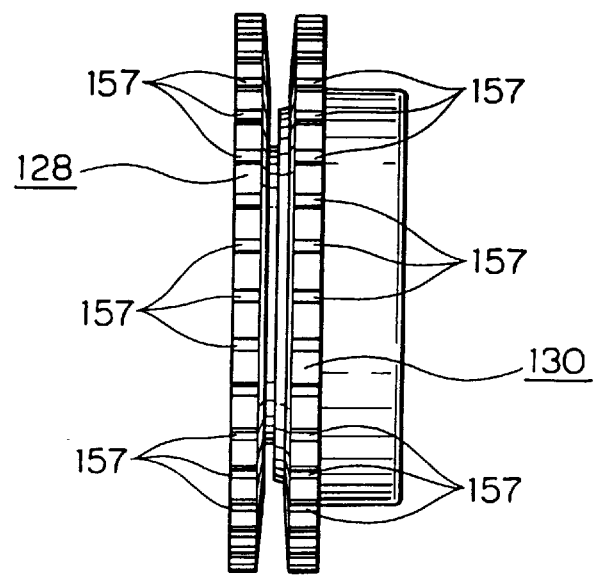
FIG. 11 is a side view of a driven disc and an idler disc to be assembled in the ninth embodiment.
Figure 12:
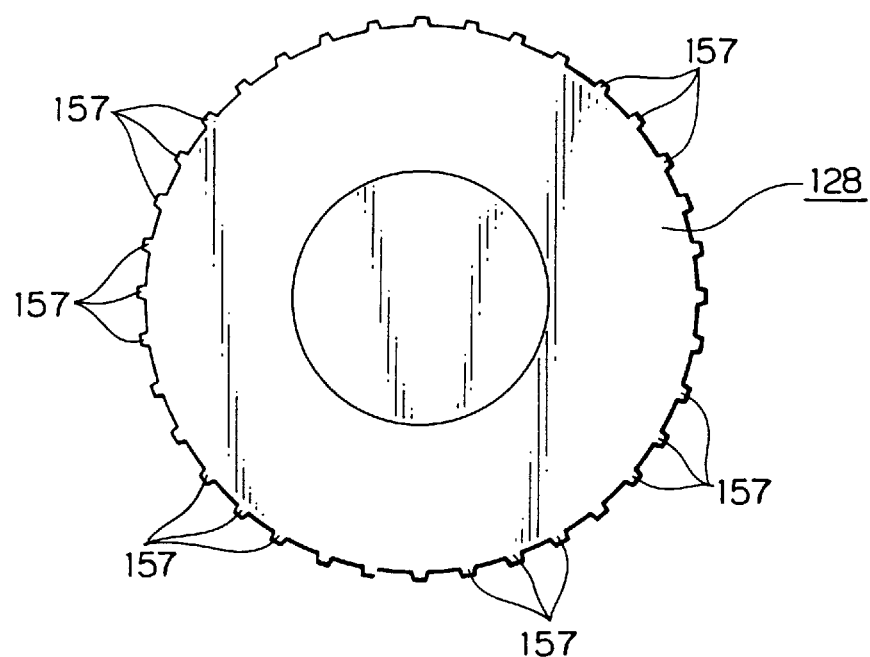
FIG. 12 is a view seen from the left side of FIG. 11.

Next, FIGS. 10 to 12 illustrate a ninth embodiment of the present invention. In these drawings, the main rotary shaft 119 is rotatably supported by a pair of ball bearings 116a, 116b inside the housing 115. These ball bearings 116a, 116b are capable of supporting a radial load and a thrust load, such as a deep-groove type or angular type bearings. In the illustrated example, an angle of contact is given to the paired ball bearings 116a, 116b in the state that they are combined with each other in front. These paired ball bearings 116a, 116b are provided at two positions for sandwiching therebetween the driven disc 128 and the idler disc 130 supported in the environs of the middle portion of the main rotary shaft 119 from the both sides in the axial direction. For this reason, one end surface (the right end surface in FIG. 10) of an outer race 150a for constituting one ball bearing 116a (the right one in FIG. 10) out of the paired ball bearings 116a, 116b is urged upon a step portion 151 formed on the inner peripheral surface of the housing 115, and the other end surface (the left end surface in FIG. 10) of an inner race 152a is urged upon one surface (the right surface in FIG. 10) of an outward flange portion 153 fixed to the outer peripheral surface of the middle portion of the main rotary shaft 119, respectively. On the other hand, one end surface of the inner race 152b of the other 116b of the ball bearings (the left one in FIG. 10) is urged upon a step portion 154 formed in the middle portion of the main rotary shaft 119. In addition, an end surface of a cylindrical screw member 155 which is threadably engaged with an opening of the housing 115 is urged upon the other end surface of the outer race 150*b* of the ball bearing 116*b*. A lock nut 156 is threadably engaged with a part of this screw member 155 protruded from the housing 115.

In the middle portion of the main rotary shaft 119 which is rotatably supported inside the housing 115 as described above, the driven disc 128 and the idler disc 130 are supported in the same manner as those of the seventh and eighth embodiments described above. Note that, in the present embodiment, a layout of these driven disc 128 and idler disc 130 is reverse to that of the seventh embodiment or the eighth embodiment with respect to the axial direction of the main rotary shaft 119. Also, a rolling bearing 147 is directly provided between the sleeve 127 and the idler disc 130, while a loading cam 165 for constituting the loading cam device 129 is supported to be displaceable only in the axial direction by the spline 131 in the environs of the sleeve 127. A coned disc spring 138 for applying preload is provided between a loading nut 135 threadably fixed to an end of the sleeve 127 and the loading cam 165. However, a layout of the discs 128, 130 does not matter in terms of the functions of the electric power steering apparatus (the positions of the discs are replaceable).

Fins 157, 157 for agitating oil (traction grease) contained in the housing 115 are provided on the outer peripheral edges of the driven disc 128 and the idler disc 130 which are rotatably supported in the housing 115 as described above. Each of these fins 157, 157 serves to agitate the oil filled in the housing 115 at the time of operation of the electric power steering apparatus, so as to supply this oil into a contact portion between the driving frictional surface 126 and the driven frictional surface 142 serving as the power transmission portion. Note that the fins 157, 157 may be disposed on the outer peripheral edge of at least one of the driven disc 128 and the idler disc 130, instead of being disposed on the outer peripheral edges of both of them.

A torque detection unit 158 for detecting a torque applied on the main rotary shaft 119 is provided in a portion which is a little closer to the steering wheel side (the right side in FIG. 10) than the driven disc 128 and the idler disc 130 inside the housing 115. This torque detection unit 158 detects a torque which is given from the transmission shaft 120, connected to the steering shaft 102, to the main rotary shaft 119 in accordance with an amount of torsion of the torsion bar 121, so as to send a detected value by the torque sensor 103 to the control unit 106 (FIG. 18). Then, this control unit 106 energizes the electric motor 105 which serves as the power source of the electric power steering apparatus in accordance with this detected value. The structures and operations of the torque detection unit 158 and the control unit 106 are widely known conventionally, and a detailed description thereof will be omitted since they are not essential to the present invention.

One of the ball bearings 116*a* which is provided between the torque sensor 103, the driven disc 128 and the idler disc 130 is a ball bearing with a seal. Then, this ball bearing 116*a* with a seal prevents the traction grease, which is the oily component filled in the portion with the driven disc 128 and the idler disc 130 contained therein, from being mixed with normal grease which is applied on a movable portion of the torque detection unit 158 inside the housing 115. In other words, the greases of different kinds are prevented from being mixed with each other by the ball bearing 116*a*, thereby preventing deterioration of these two greases. Further, it is possible to preserve a dry condition free from oil in a portion in which the torque detection unit 158 is installed. Since other arrangements and operations are the same as those of the seventh embodiment described above, the same referential numerals are given to the portions identical to those of the seventh embodiment, and a description thereof will be omitted.

Figure 13:
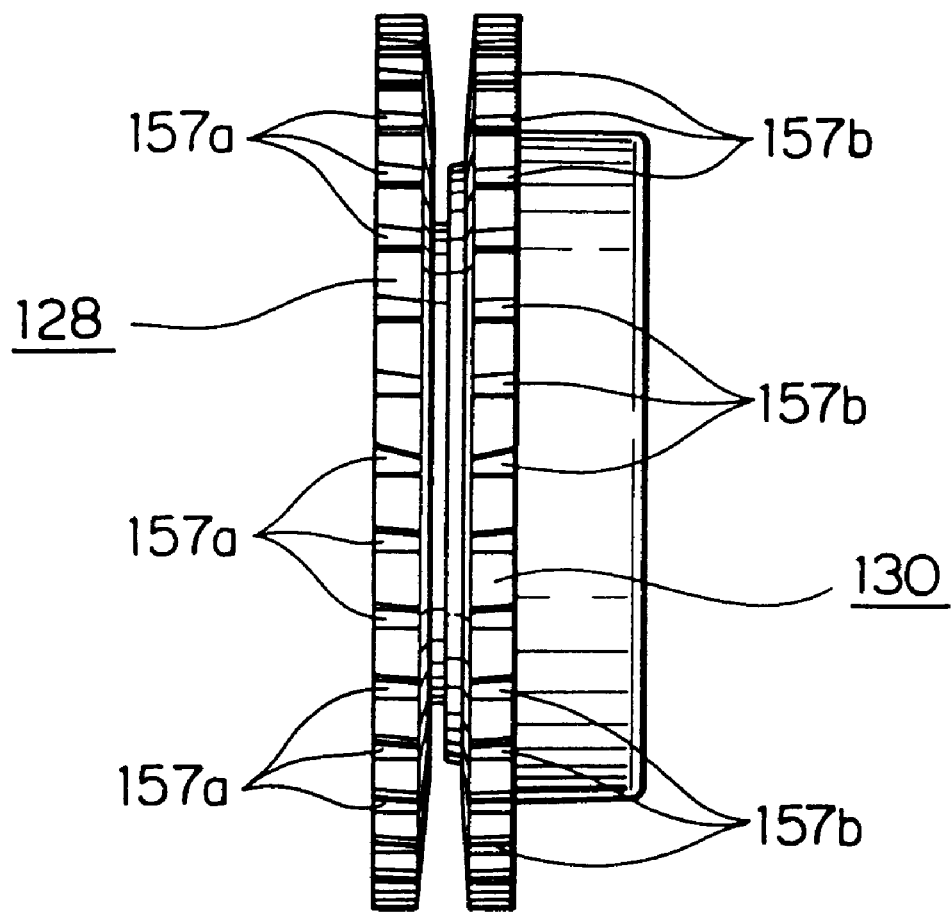
FIG. 13 is a view for showing an tenth embodiment of the present invention, in the same manner as FIG. 11.

Next, FIG. 13 illustrates a tenth embodiment of the present invention. In the present embodiment, one side or both sides in the circumferential direction of each of the fins 157*a*, 157*b* provided at the outer peripheral edges of the driven disc 128 and the idler disc 130 are inclined with respect to the axial direction of the discs 157, 158 (the right and left direction in FIG. 13) in reverse directions to each other. Accordingly, in the present embodiment, upon rotation of the driven disc 128 and the idler disc 130, the fins 157*a*, 157*b* agitate the traction grease filled in the housing and, at the same time, causes this traction grease to run in the axial direction of the both discs 157, 158. Consequently, the traction grease can be supplied more smoothly to the contact potion between the driving frictional surface 126 and the driven frictional surface 142 (see FIG. 10). Since the other arrangements and operations are the same as those of the ninth embodiment described, further description thereof will be omitted.

Figure 14:
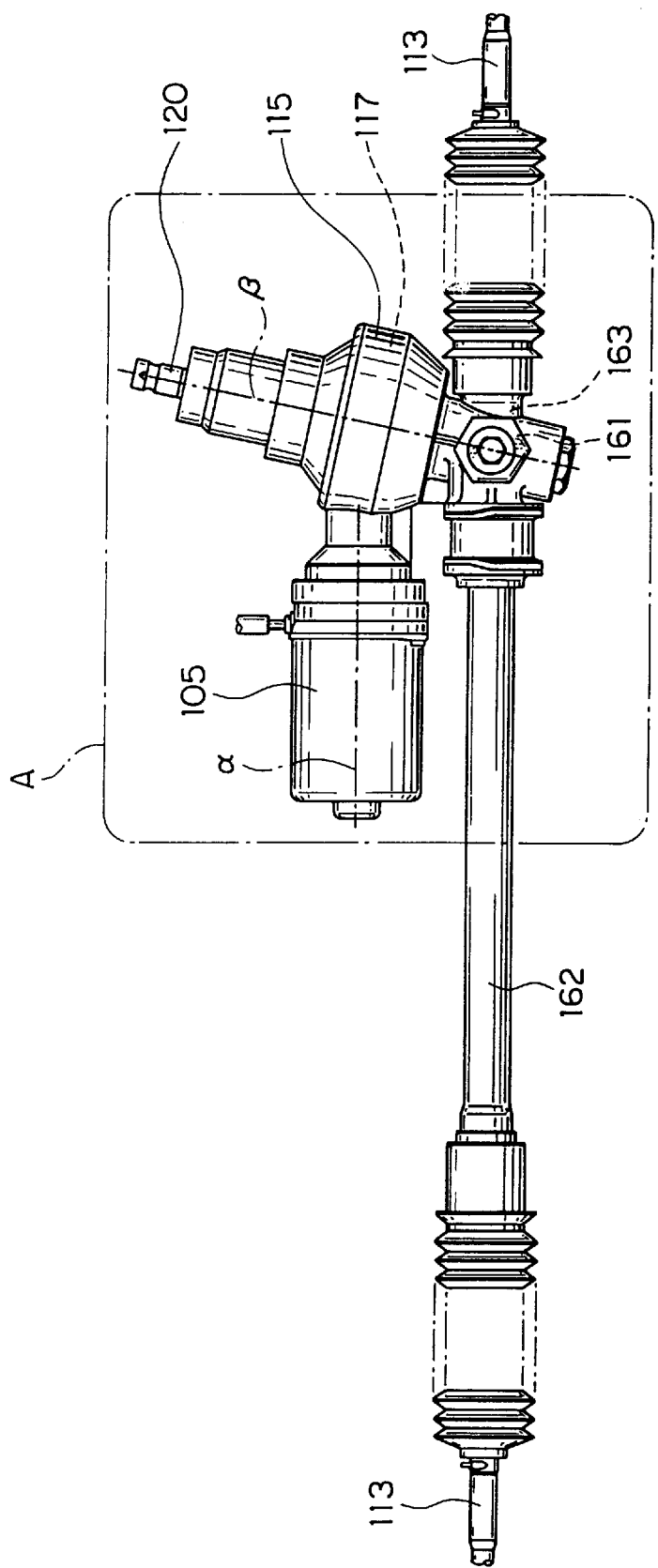
FIG. 14 is a front view for showing an eleventh embodiment of the present invention.
Figure 15:
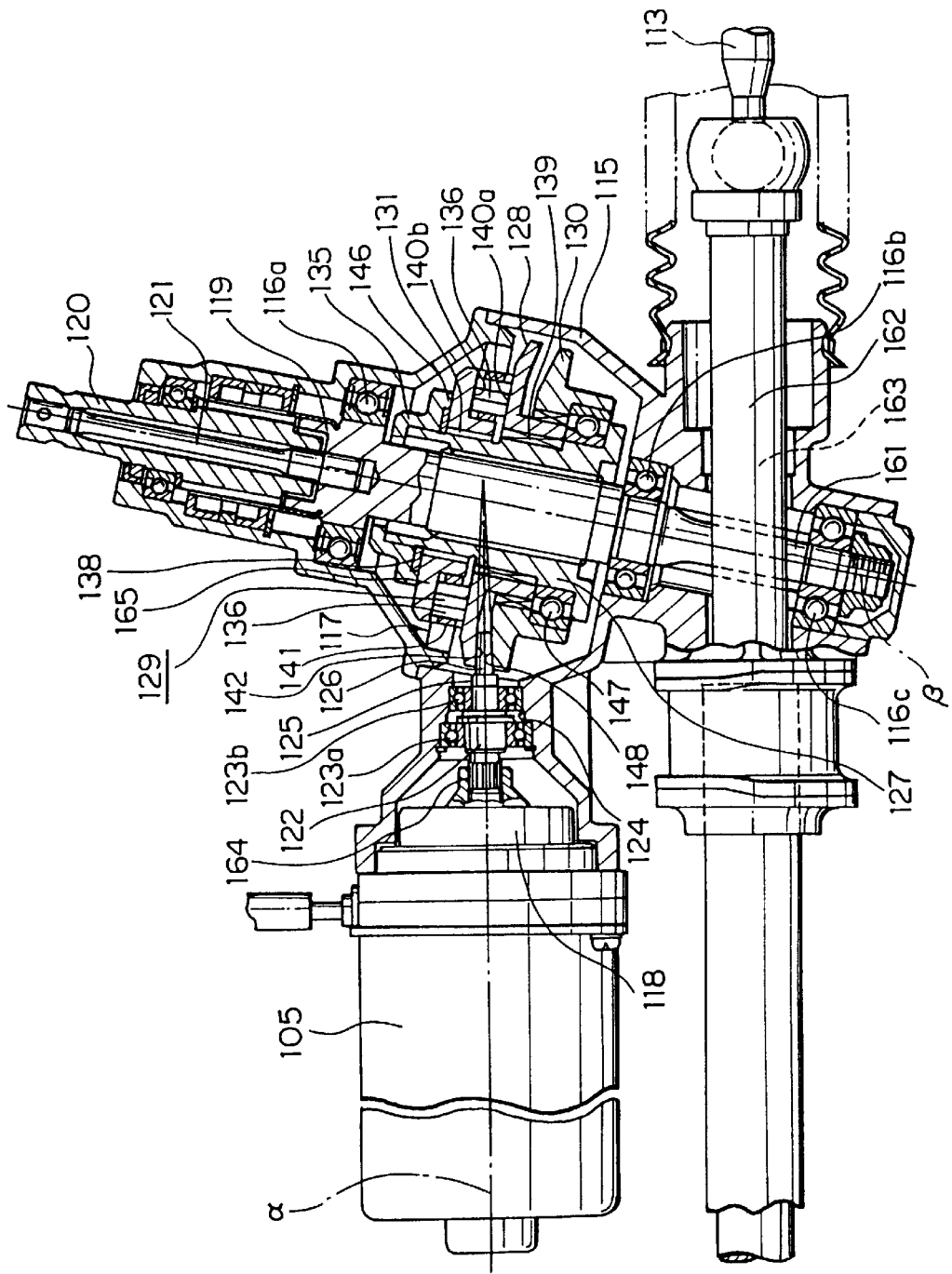
FIG. 15 is a cross-sectional view of the portion A in FIG. 14, in an enlarged manner.

Next, FIGS. 14 and 15 illustrate an eleventh embodiment of the present invention. While the foregoing seventh to tenth embodiments illustrate examples in which the present invention is applied to an electric power steering apparatus installed in the cockpit of a car (at a position closer to the driver's seat than the dashboard panel), the present embodiment shows an example in which the present invention is applied to an electric power steering apparatus installed in the engine compartment. Note that, in the speed reducing device 117 employed in this example, like in the speed reducing device 117 of the eighth embodiment shown in FIG. 9, the central axis α of the auxiliary rotary shaft 122 and the central axis β of the main rotary shaft 119 are crossing in an inclined manner. However, this only relates to the layout of the steering shaft, etc., for constituting the steering apparatus, so that, like in the speed reducing device of the above-mentioned seventh embodiment shown in FIG. 8, a structure in which the central axis α of the auxiliary rotary shaft 122 and the central axis β of the main rotary shaft 119 are crossing at right angles may be employed.

In the case of the present embodiment, a pinion 161 which is fixed to the end portion of the main rotary shaft 119 for constituting the above-mentioned speed reducing device 117 and a rack 163 which is provided on a steering rod 162 are engaged with each other. That is, at the leading end portion of the main rotary shaft 119, a portion which is more protruded to the steering rod 162 side than the driven disc 128 and the idler disc 130 is rotatably supported by a pair of ball bearings 116*b*, 116*c*. Also, the ball bearings 116*b*, 116*c* are provided on both sides of the steering rod 162, so as to secure the rigidity of the engagement portion between the pinion 161 and the rack 163. Also, in the illustrated example, the steering rod 162 is provided substantially on the same plane on which the central axes of the main rotary shaft 119 and the auxiliary rotary shaft 122 are present (though it is impossible to position them on exactly the same plane since the steering rod 162 and the main rotary shaft 119 are provided in a direction of torsion). Further, the steering rod 162 and the auxiliary rotary shaft 122 (and the rotary shaft of the electric-motor 105) are provided in parallel to each other.

With such structure as described above, when a steering angle is given to a front wheel which serves as the steerable wheel, the steering rod 162 is displaced in the axial direction in accordance with a rotation of the main rotary shaft 119, and tie rods 113, 113 which are connected to the ends of this steering rod 162 are pushed and pulled in accordance with this displacement of the steering rod 162 in the axial direction, so as to give the steering angle to the steerable wheel. With such structure of the present embodiment, it becomes easier to reduce the size of the electric power steering apparatus and to install it in a limited space of the engine compartment. Since the other arrangements and operations are the same as those of the seventh or the ninth embodiment described above, the same referential numerals are given to the identical portions and the redundant description thereof will be omitted.

Figure 16:
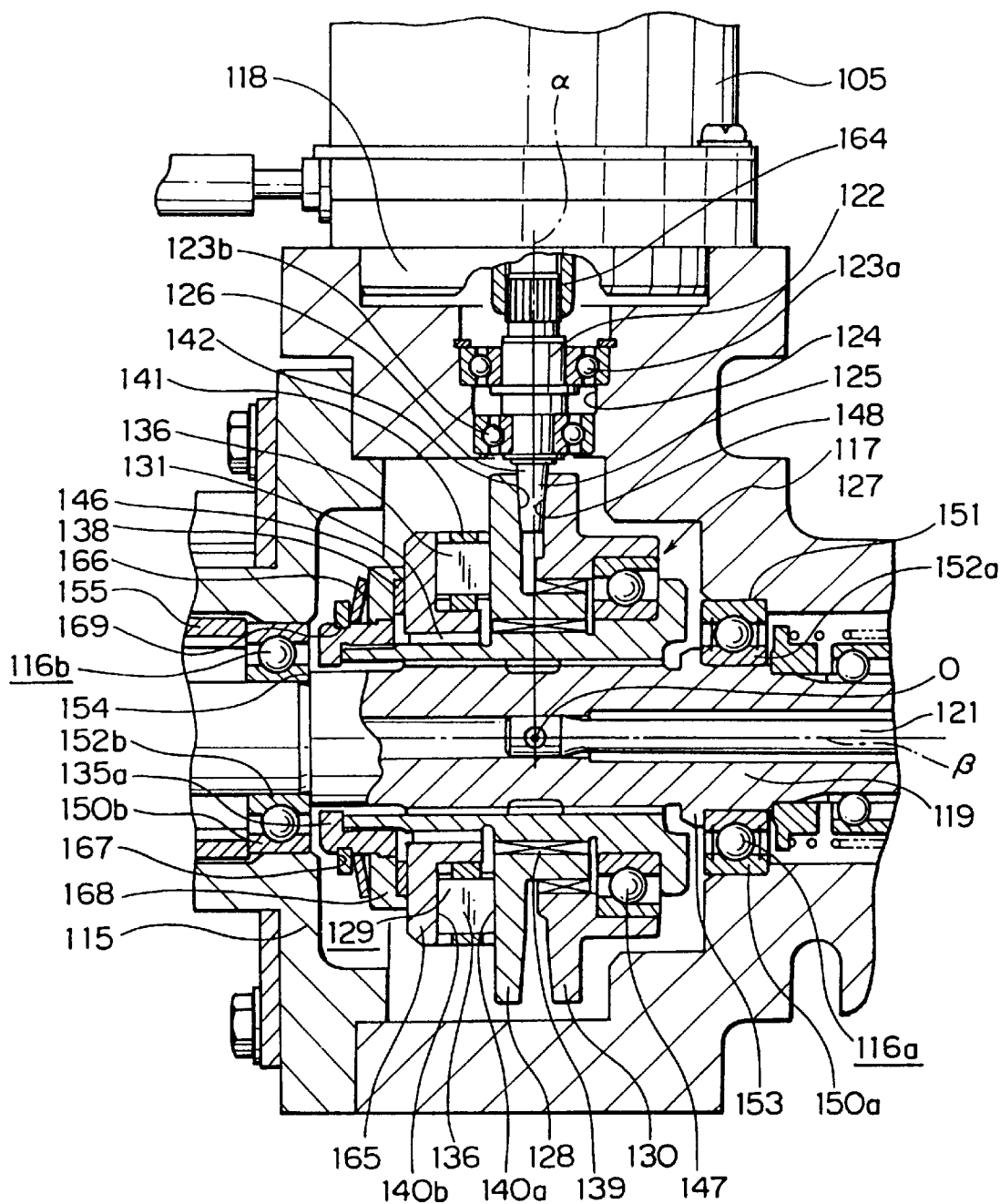
FIG. 16 is a partial cross-sectional view for showing a twelfth embodiment of the present invention.
Figure 17:
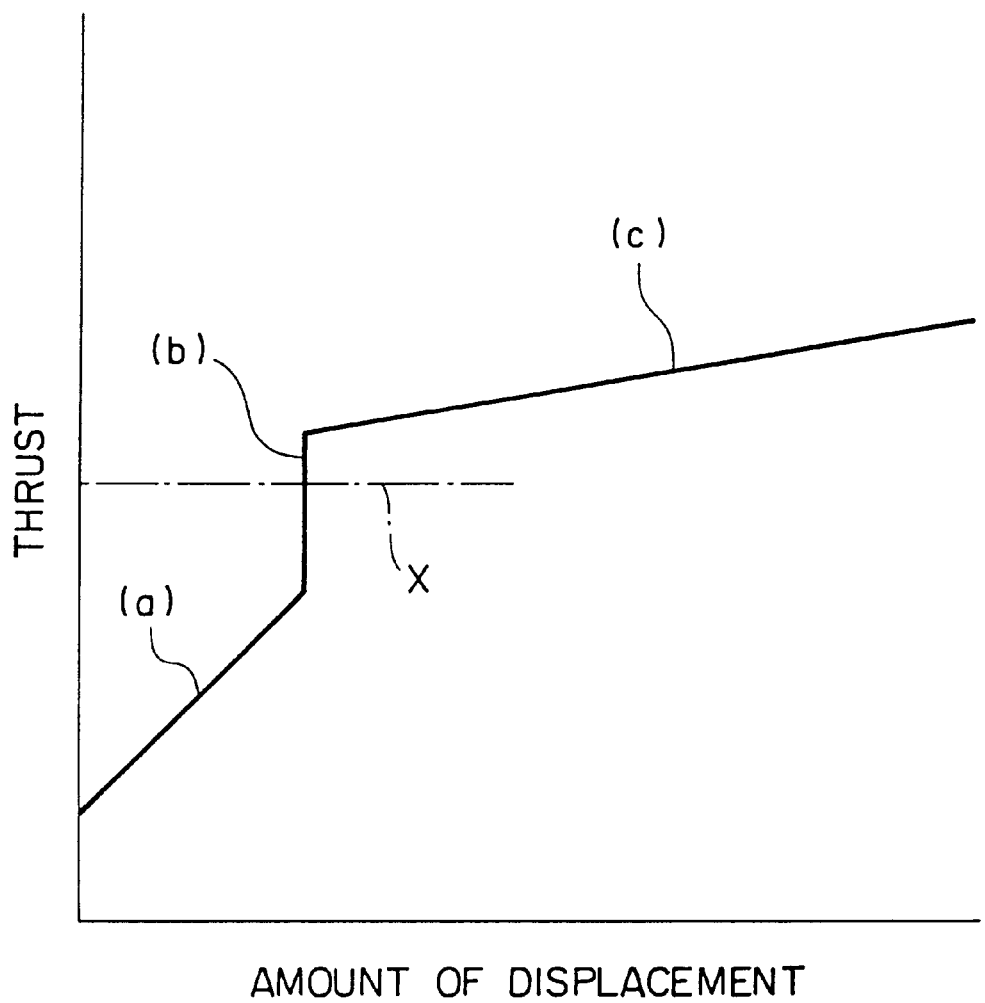
FIG. 17 is a graph for showing a relation between an amount of displacement of a loading cam and a thrust generated by a loading cam device.

Next, FIGS. 16 and 17 illustrate a twelfth embodiment of the present invention. In the present embodiment, a coned disc spring 138 and a second coned disc spring 166 are provided in series in the axial direction (the right and left direction in FIG. 16) on the loading cam device 129. That is, between the loading cam 165 for constituting the loading cam device 129 and a retaining ring 167 retained on the outer peripheral surface of a loading nut 135a threadably fixed to an end of the sleeve 127, there are provided the coned disc spring 138, an annular pressurizing plate 168, and the second coned disc spring 166 in series in that order from the side of the loading cam 165. Also, the inner peripheral edge of this pressurizing plate 168 is engaged with a groove 169 which is formed along the entire outer peripheral surface of the loading nut 135a to be displaceable to some extent in the axial direction. Then, in a state that the pressurizing plate 168 is the most separated from the retaining ring 167, the second disc spring 166 is compressed to some extent so as to give the pressurizing plate 168 a comparatively large elasticity toward the loading nut 135a.

The coned disc spring 138 elastically presses the loading cam 165 toward the driven disc 128 to generate a predetermined pressurization in the loading cam device 129 constituted to include this loading cam 165, and is assembled in each of the foregoing embodiments. It should be noted that in a part closer to the outer periphery of one surface of the pressurizing plate 168 in the environs of the disc spring 138, there is formed a protrusion 146. The height of this protrusion is, like the protrusion 146 provided on the loading nut 135 in the seventh embodiment described above, smaller than the thickness of the disc spring 138 in its free state, but is larger than the thickness of this disc spring 138 in its most compressed state. On the other hand, the second coned disc spring 166 is provided to prevent a thrust which is generated by the loading cam device 129 from being unnecessarily larger, and has a large elasticity than the disc spring 138 at least in its assembled state.

This arrangement will be described with reference to FIG. 17. FIG. 17 shows a relation between an amount of displacement of the loading cam 165 and a thrust generated by the loading cam device 129 (a force to press the driven disc 128 toward the driving roller 125). When the loading cam device 129 is not operated, that is, in a state that rollers 136, 136 for constituting this loading cam device 129 are provided in the recessive parts of cam surfaces 140a, 140b formed on the surfaces of the loading cam 165 and the driven disc 128 opposite to each other, the thrust generated by the loading cam device 129 becomes a set load of the coned disc spring 138.

On the other hand, when the loading cam device 129 is operated, that is, in a state that the rollers 136, 136 have ridden on the risen parts of the cam surfaces 140a, 140b, the thrust is increased upon compression of the disc spring 138, as indicated by the inclined line (a) in FIG. 17. Then, after the loading cam 165 is brought into contact with the protrusion 146, this loading cam 165 is not displaced any more and only the thrust is increased, as indicated by the perpendicular line (b) in FIG. 17. Then, if this thrust exceeds the maximum value determined for normal use (indicated by the chain line x in FIG. 17), the second coned disc spring 166 starts to be compressed and, as indicated by the inclined line (c) in FIG. 17, the loading cam 165 starts to be displaced again. Consequently, it is possible to prevent an extreme rise of the thrust of the loading cam device 129, so as to prevent damage to the driven disc 128, to the idler disc 130, and further, to the rolling bearing 147 for supporting this idler disc 130. There is also provided a function of preventing a torque transmitted by the loading cam device 129 from becoming excessively large.

The electric power steering apparatus of the present invention is constituted and operated as stated above. However, in this apparatus, neither noise nor vibration is generated, and no backlash is brought about, thereby giving no unpleasant sensation to the vehicle occupants including the driver when the steering angle is applied, and this is achieved without deteriorating the operability of the steering wheel. Moreover, this apparatus can be formed in a small size while the energy efficiency of the electric motor can be enhanced, does not need to use a gear made of synthetic resin with inferior heat-resisting performance, may be installed inside an engine compartment which rises to high temperature, and accordingly, can be assembled in any kind of automobile including high-grade or high-quality cars, thus contributing to expansion of use of the electric power steering apparatus.

What is claimed is:

1. A frictional transmission, comprising:
    an input rotary shaft and an output rotary shaft arranged in directions in which respective central axes thereof cross substantially at a point (O);
    an input roller supported coaxially with said input rotary shaft for rotating with said input rotary shaft;
    an input frictional surface provided on the input roller coaxially with said input rotary shaft;
    an output disc supported coaxially with said output rotary shaft for rotating with said output rotary shaft;
    an output frictional surface provided on said output disc coaxially with said output rotary shaft,
    a supporting member rotatably supporting said output disc and supported by said output rotary shaft to be rotatable therewith and movable axially along said output rotary shaft;
    an idler disc disposed such that said input roller is sandwiched between said output disc and said idler disc;
    a holding member rotatably supporting said idler disc; and
    a loading cam device arranged in a torque transmitting path from said input rotary shaft to said output rotary shaft and generating a thrust force depending on an input torque to press said input frictional surface of said input roller and said output frictional surface of said output disc against each other during transmission of rotation from said input rotary shaft to said output shaft.

2. A frictional transmission according to claim 1, wherein said holding member is held rotatably on said supporting member.

3. A frictional transmission according to claim 2, further comprising a biasing member biasing said input frictional surface and said output frictional surface against each other.

4. A frictional transmission according to claim 3, wherein said biasing member includes a prepressure spring.

5. A frictional transmission according to claim 1, further comprising a biasing member biasing said input frictional surface and said output frictional surface against each other.

6. A frictional transmission according to claim 5, wherein said biasing member includes a prepressure spring.

7. A frictional transmission according to claim 3, wherein said loading cam device is disposed between said output disc and said supporting member.

8. A frictional transmission according to claim 7, wherein said loading cam device includes a first cam element formed on said output disc, a second cam element integral with said supporting member, and a torque transmitting element disposed between said first cam element and said second cam element in contact therewith.

9. A frictional transmission according to claim 3, wherein said loading cam device is disposed between said input shaft and said input roller.

10. A frictional transmission according to claim 9, wherein said loading cam device includes a first cam element integral with said input shaft, a second cam element formed integrally with said input roller, and a torque transmitting element disposed between said first cam element and said second cam element in contact therewith.

11. A frictional transmission according to claim 7 or 9, wherein lines extended from generatrices of the input frictional surface substantially intersect with said point (O).

12. A frictional transmission according to claim 11, wherein lines extended from generatrices of the output frictional surface substantially intersect with said point (O).

13. A frictional transmission according to claim 1, wherein said supporting member includes a sleeve fitted on said output shaft in spline engagement therewith.

14. A frictional transmission according to claim 13, wherein said holding member includes a cylindrical portion rotatably held on said sleeve.

15. A frictional transmission according to claim 14, wherein said idler disc is coaxial with said output shaft and is held on said cylindrical portion through a ball bearing.

16. A frictional transmission according to claim 15, further comprising a prepressure spring biasing said input frictional surface and said output frictional surface against each other.

17. A frictional transmission according to claim 16, wherein said loading cam device is disposed between said output disc and said supporting member.

18. A frictional transmission according to claim 17, wherein said loading cam device includes a first cam element formed on said output disc, a second cam element integral with said supporting member, and a torque transmitting element disposed between said first cam element and said second cam element in contact therewith.

19. A frictional transmission according to claim 16, wherein said loading cam device is disposed between said input shaft and said input roller.

20. A frictional transmission according to claim 19, wherein said loading cam device includes a first cam element integral with said input shaft, a second cam element formed integrally with said input roller, and a torque transmitting element disposed between said first cam element and said second cam element in contact therewith.

21. A frictional transmission according to claim 18 or 20, wherein lines extended from generatrices of said input frictional surface substantially intersect with said point (O).

22. A frictional transmission according to claim 21, wherein lines extended from generatrices of said output frictional surface substantially intersect with said point (O).

23. A frictional transmission according to claim 2, further comprising a prepressure spring biasing said input frictional surface and output frictional surface against each other.

24. A frictional transmission according to claim 1 or 2, wherein said loading cam device is disposed between said output disc and said supporting member.

25. A frictional transmission according to claim 24, wherein said loading cam device includes a first cam element formed on said output disc, a second cam element integral with said supporting member, and a torque transmitting element disposed between said first cam element and said second cam element in contact therewith.

26. A frictional transmission according to claim 1 or 2, wherein said loading cam device is disposed between said input shaft and said input roller.

27. A frictional transmission according to claim 26, wherein said loading cam device includes a first cam element integral with said input shaft, a second cam element integral with said input roller, and a torque transmitting element disposed between said first cam element and said second cam element in contact therewith.

28. A frictional transmission according to claim 1 or 2, wherein lines extended from generatrices of said input frictional surface substantially intersect with said point (O).

29. A frictional transmission according to claim 28, wherein lines extended from generatrices of said output frictional surface substantially intersect with said point (O).

30. A frictional transmission, comprising:
a first rotary shaft and a second rotary shaft arranged in directions in which respective central axes thereof cross substantially at a point (O);
a first rotary transmission member supported coaxially with said first rotary shaft for rotating with said first rotary shaft;
a first frictional surface provided on said first transmission member coaxially with said first rotary shaft;
a second rotary transmission member supported coaxially with said second rotary shaft for rotating with said second rotary shaft;
a second frictional surface provided on said second transmission member coaxially with said second rotary shaft,
a supporting member rotatably supporting said second transmission member and supported by said second rotary shaft to be rotatable therewith and movable axially along said second rotary shaft;
a rotary idler member disposed such that said first transmission member is sandwiched between said second transmission member and said idler member;
a holding member rotatably supporting said idler member; and
a loading cam device arranged in a torque transmitting path between said first rotary shaft and said second rotary shaft and generating a thrust force depending on an input torque to urge said first frictional surface and said second frictional surface against each other during transmission of rotation between said first rotary shaft and said second rotary shaft.

31. A frictional transmission according to claim 30, wherein said holding member is held rotatably on said supporting member.

32. A frictional transmission according to claim 31, further comprising a prepressure spring biasing said first frictional surface and said second frictional surface against each other.

33. A frictional transmission according to claim 30, further comprising a biasing member biasing said first frictional surface and said second frictional surface against each other.

34. A frictional transmission according to claim 32, wherein said loading cam device is disposed between said second transmission member and said supporting member.

35. A frictional transmission according to claim 34, wherein said loading cam device includes a first cam element formed on said second transmission member, a second cam element integral with said supporting member, and a torque transmitting element disposed between said first cam element and said second cam element in contact therewith.

36. A frictional transmission according to claim 32, wherein said loading cam device is disposed between said first shaft and said first transmission member.

37. A frictional transmission according to claim 36, wherein said loading cam device includes a first cam element integral with said first shaft, a second cam element integral with said first transmission member, and a torque transmitting element disposed between said first cam element and said second cam element in contact therewith.

38. A frictional transmission according to claim 34 or 36, wherein lines extended from generatrices of said first frictional surface substantially intersect with said point (O).

39. A frictional transmission according to claim 38, wherein lines extended from generatrices of said second frictional surface substantially intersect with said point (O).

40. A frictional transmission according to claim 30, wherein said supporting member includes a sleeve fitted on said second shaft in spline engagement therewith.

41. A frictional transmission according to claim 40, wherein said holding member includes a cylindrical portion rotatably held on said sleeve.

42. A frictional transmission according to claim 41, wherein said idler member is coaxial with said second shaft and is held on said cylindrical portion through a ball bearing.

43. A frictional transmission according to claim 42, further comprising a prepressure spring biasing said first frictional surface and said second frictional surface against each other.

44. A frictional transmission according to claim 43, wherein said loading cam device is disposed between said second transmission member and said supporting member.

45. A frictional transmission according to claim 44, wherein said loading cam device includes a first cam element formed on said second transmission member, a second cam element integral with said supporting member, and a torque transmitting element disposed between said first cam element and said second cam element in contact therewith.

46. A frictional transmission according to claim 43, wherein said loading cam device is disposed between said first shaft and said first transmission member.

47. A frictional transmission according to claim 46, wherein said loading cam device includes a first cam element integral with said first shaft, a second cam element integral with said first transmission member, and a torque transmitting element disposed between said first cam element and said second cam element in contact therewith.

48. A frictional transmission according to claim 44 or 46, wherein lines extended from generatrices of said first frictional surface substantially intersect with said point (O).

49. A frictional transmission according to claim 48, wherein lines extended from generatrices of said second frictional surface substantially intersect with said point (O).

50. A frictional transmission according to claim 30, further comprising a prepressure spring biasing said first frictional surface and said second frictional surface against each other.

51. A frictional transmission according to claim 30 or 31, wherein said loading cam device is disposed between said second transmission member and said supporting member.

52. A frictional transmission according to claim 51, wherein said loading cam device includes a first cam element formed on said second transmission member, a second cam element integral with said supporting member, and a torque transmitting element disposed between said first cam element and said second cam element in contact therewith.

53. A frictional transmission according to claim 30 or 31, wherein said loading cam device is disposed between said first shaft and said first transmission member.

54. A frictional transmission according to claim 53, wherein said loading cam device includes a first cam element integral with said first shaft, a second cam element integral with said first transmission member, and a torque transmitting element disposed between said first cam element and said second cam element in contact therewith.

55. A frictional transmission according to claim 30 or 31, wherein lines extended from generatrices of said first frictional surface substantially intersect with said point (O).

56. A frictional transmission according to claim 54, wherein lines extended from generatrices of said second frictional surface substantially intersect with said point (O).

57. A frictional transmission according to claim 55, wherein said first rotary shaft is an input shaft and said second rotary shaft is an output shaft.

58. A frictional transmission according to claim 33, wherein said loading cam device is disposed between said second transmission member and said supporting member.

59. A frictional transmission according to claim 58, wherein said loading cam device includes a first cam element formed on said second transmission member, a second cam element integral with said supporting member, and a torque transmitting element disposed between said first cam element and said second cam element in contact therewith.

60. A frictional transmission according to claim 33, wherein said loading cam device is disposed between said first shaft and said first transmission member.

61. A frictional transmission according to claim 60, wherein said loading cam device includes a first cam element integral with said first shaft, a second cam element integral with said first transmission member, and a torque transmitting element disposed between said first cam element and said second cam element in contact therewith.

62. A frictional transmission according to claim 58 or 60, wherein lines extended from generatrices of said first frictional surface intersect substantially with said point (O).

63. A frictional transmission according to claim 62, wherein lines extended from generatrices of said second frictional surface substantially intersect with said point (O).

64. An electric power steering apparatus, comprising:
a main rotary shaft to which rotational power is to be imparted based on operation of a steering wheel and which gives a steering angle corresponding to an amount of rotation to a steering shaft connected to the steering wheel;
an auxiliary rotary shaft which is disposed so that a central axis of the auxiliary rotary shaft crosses a central axis of the main rotary shaft substantially at a point (O) and which is rotationally driven by an electric motor;
a driving roller supported coaxially with the auxiliary rotary shaft to be rotatable with the auxiliary rotary shaft;
a driving frictional surface provided on the driving roller coaxially with said auxiliary rotary shaft;
a driven disc supported coaxially with said main rotary shaft;
a driven frictional surface provided on the driven disc coaxially with said main rotary shaft,
a supporting member rotatably supporting said driven disc and supported by said main rotary shaft to be rotatable therewith and movable axially along said main rotary shaft;

an idler disc disposed such that said driving roller is sandwiched between said driven disc and said idler disc;

a holding member rotatably supporting said idler disc; and a loading cam device arranged in a torque transmitting path from said auxiliary rotary shaft to said main rotary shaft and generating a thrust force depending on an input torque to press said driving frictional surface of said driving roller and said driven frictional surface of said driven disc against each other during transmission of rotation from said auxiliary rotary shaft to said main rotary shaft.

65. An electric power steering apparatus according to claim 64, wherein said holding member is held rotatably on said supporting member.

66. An electric power steering apparatus according to claim 65, further comprising a prepressure spring biasing said driving frictional surface and said driven frictional surface against each other.

67. An electric power steering apparatus according to claim 64, further comprising a prepressure spring biasing said driving frictional surface and said driven frictional surface against each other.

68. An electric power steering apparatus according to claim 66, wherein said loading cam device is disposed between said driven disc and said supporting member.

69. An electric power steering apparatus according to claim 68, wherein said loading cam device includes a first cam element formed on said driven disc, a second cam element integral with said supporting member, and a torque transmitting element disposed between said first cam element and said second cam element in contact therewith.

70. An electric power steering apparatus according to claim 66, wherein said loading cam device is disposed between said auxiliary rotary shaft and said driving roller.

71. An electric power steering apparatus according to claim 70, wherein said loading cam device includes a first cam element integral with said auxiliary rotary shaft, a second cam element integral with said driving roller, and a torque transmitting element disposed between said first cam element and said second cam element in contact therewith.

72. An electric,power steering apparatus according to claim 68 or 70, wherein lines extended from generatrices of the driving frictional surface substantially intersect with said point (O).

73. An electric power steering apparatus according to claim 72, wherein lines extended from generatrices of the driven frictional surface substantially intersect with said point (O).

74. An electric power steering apparatus according to claim 64, wherein said supporting member includes a sleeve fitted on said main rotary shaft in spline engagement therewith.

75. An electric power steering apparatus according to claim 74, wherein said holding member includes a cylindrical portion rotatably held on said sleeve.

76. An electric power steering apparatus according to claim 75, wherein said idler disc is coaxial with said main rotary shaft and is held on said cylindrical portion through a ball bearing.

77. An electric power steering apparatus according to claim 76, further comprising a prepressure spring biasing said driving frictional surface and said driven frictional surface against each other.

78. An electric power steering apparatus according to claim 77, wherein said loading cam device is disposed between said driven disc and said supporting member.

79. An electric power steering apparatus according to claim 78, wherein said loading cam device includes a first cam element formed on said driven disc, a second cam element integral with said supporting member, and a torque transmitting element disposed between said first cam element and said second cam element in contact therewith.

80. An electric power steering apparatus according to claim 77, wherein said loading cam device is disposed between said auxiliary rotary shaft and said driving roller.

81. An electric power steering apparatus according to claim 80, wherein said loading cam device includes a first cam element integral with said auxiliary rotary shaft, a second cam element integral with said driving roller, and a torque transmitting element disposed between said first cam element and said second cam element in contact therewith.

82. An electric power steering apparatus according to claim 78 or 80, wherein lines extended from generatrices of the driving frictional surface substantially intersect with said point (O).

83. An electric power steering apparatus according to claim 82, wherein lines extended from generatrices of the driven frictional surface substantially intersect with said point (O).

84. An electric power steering apparatus according to claim 64 or 65, wherein said loading cam device is disposed between said driven disc and said supporting member.

85. An electric power steering apparatus according to claim 84, wherein said loading cam device includes a first cam element formed on said driven disc, a second cam element integral with said supporting member, and a torque transmitting element disposed between said first cam element and said second cam element in contact therewith.

86. An electric power steering apparatus according to claim 64 or 65, wherein said loading cam device is disposed between said auxiliary rotary shaft and said driving roller.

87. An electric power steering apparatus according to claim 86, wherein said loading cam device includes a first cam element integral with said auxiliary rotary shaft, a second cam element integral with said driving roller, and a torque transmitting element disposed between said first cam element and said second cam element in contact therewith.

88. An electric power steering apparatus according to claim 64 or 65, wherein lines extended from generatrices of the driving frictional surface substantially intersect with said point (O).

89. An electric power steering apparatus according to claim 88, wherein lines extended from generatrices of the driven frictional surface substantially intersect with said point (O).

90. An electric power steering apparatus according to claim 64, further comprising a biasing member biasing said driving frictional surface and said driven frictional surface against each other.

91. An electric power steering apparatus according to claim 90, wherein said loading cam device is disposed between said driven disc and said supporting member.

92. An electric power steering apparatus according to claim 91, wherein said loading cam device includes a first cam element formed on said driven disc, a second cam element integral with said supporting member, and a torque transmitting element disposed between said first cam element and said second cam element in contact therewith.

93. An electric power steering apparatus according to claim 90, wherein said loading cam device is disposed between said auxiliary rotary shaft and said driving roller.

94. An electric power steering apparatus according to claim 93, wherein said loading cam device includes a first cam element integral with said auxiliary rotary shaft, a second cam element integral with said driving roller, and a torque transmitting element disposed between said first cam element and said second cam element in contact therewith.

95. An electric power steering apparatus according to claim 91 or 93, wherein lines extended from generatrices of the driving frictional surface substantially intersect with said point (O).

96. An electric power steering apparatus according to claim 95, wherein lines extended from generatrices of the driven frictional surface substantially intersect with said point (O). wherein said loading cam device includes a first cam element integral with said first shaft, a second cam element integral with said first transmission member, and a torque transmitting element disposed between said first cam element and said second cam element in contact therewith.

* * * * *